US011533349B2

(12) United States Patent
Yu et al.

(10) Patent No.: US 11,533,349 B2
(45) Date of Patent: *Dec. 20, 2022

(54) PERHIPHERAL DEVICE SHARING OVER PEER-TO-PEER CONNECTION

(71) Applicant: Citrix Systems, Inc., Fort Lauderdale, FL (US)

(72) Inventors: Yedong Yu, Nanjing (CN); Jiandong Hong, Nanjing (CN); Yajun Yao, Nanjing (CN); Mingming Ren, Nanjing (CN); Yuan Zhang, Nanjing (CN); Juanjuan Chen, Nanjing (CN); Qiaofei Zhu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,686

(22) Filed: Oct. 19, 2021

(65) Prior Publication Data
US 2022/0038519 A1 Feb. 3, 2022

Related U.S. Application Data

(63) Continuation of application No. 16/585,119, filed on Sep. 27, 2019, now Pat. No. 11,190,569, which is a
(Continued)

(51) Int. Cl.
*H04L 65/65* (2022.01)
*H04L 67/1074* (2022.01)
(Continued)

(52) U.S. Cl.
CPC .......... *H04L 65/65* (2022.05); *H04L 61/5007* (2022.05); *H04L 65/1073* (2013.01);
(Continued)

(58) Field of Classification Search
CPC . H04L 65/65; H04L 67/1078; H04L 67/1091; H04L 61/5007
See application file for complete search history.

(56) References Cited

U.S. PATENT DOCUMENTS

| 6,101,555 A | 8/2000 | Goshey et al. |
| 2011/0205965 A1 | 8/2011 | Sprigg et al. |

(Continued)

FOREIGN PATENT DOCUMENTS

| CN | 107534653 A | 1/2018 |
| JP | 2016212596 A | * 12/2016 |
| JP | 2016212596 A | 12/2016 |

OTHER PUBLICATIONS

International Search Report and Written Opinion dated May 27, 2020 in International Patent Application No. PCT/CN2019/105057.
(Continued)

*Primary Examiner* — Caroline H Jahnige
(74) *Attorney, Agent, or Firm* — Pierce Atwood LLP

(57) ABSTRACT

Disclosed is a computing system capable of performing a method that involves receiving, from a first device, a first indication that a peripheral device associated with the first device is available for sharing; sending, to a second device, a second indication that the peripheral device is available for sharing; receiving, from the second device, a request to access the peripheral device; and based at least in part on receipt of the request, causing a peer-to-peer connection to be established between the second device and the first device, the peer-to-peer connection enabling communication between the second device and the peripheral device. The peer-to-peer connection may, for example, enable direction of the peripheral device to the second device so that the peripheral device is a virtual device of the second device.

20 Claims, 14 Drawing Sheets

Related U.S. Application Data continuation of application No. PCT/DN2019/105057, filed on Sep. 10, 2019.

(51) Int. Cl.
*H04L 67/1087* (2022.01)
*H04L 65/1073* (2022.01)
*H04L 61/5007* (2022.01)
*H04L 65/70* (2022.01)

(52) U.S. Cl.
CPC .......... *H04L 65/70* (2022.05); *H04L 67/1078* (2013.01); *H04L 67/1091* (2013.01)

(56) References Cited

U.S. PATENT DOCUMENTS

| | | | |
|---|---|---|---|
| 2012/0023265 A1* | 1/2012 | Liao | G06F 13/387 710/5 |
| 2013/0063767 A1 | 3/2013 | Morris et al. | |
| 2014/0344446 A1 | 11/2014 | Rjeili et al. | |
| 2014/0365593 A1 | 12/2014 | Sun | |
| 2015/0039760 A1* | 2/2015 | Yoakum | H04L 65/1069 709/225 |
| 2016/0050281 A1 | 2/2016 | Jain et al. | |
| 2016/0081132 A1 | 3/2016 | Lee et al. | |
| 2016/0330266 A1* | 11/2016 | Bakhmutov | H04L 67/104 |
| 2017/0244800 A1 | 8/2017 | Magazine | |
| 2019/0034902 A1 | 1/2019 | Bukovics | |

OTHER PUBLICATIONS

Burnett D.C. (2017) WebRTC: Handling Media on the Web. In: Dahl D. (eds) Multimodal Interaction with W3C Standards. Springer, Cham. https://doi .org/10.1007/978-3-319-42816-1_8 (Year: 2 017).
Sredojev, Branislav, Dragan Samardzija, and Dragan Posarac. "WebRTC technology overview and signaling solution design and implementation." 2015 38th international convention on information and communication technology, electronics and microelectronics (MIPRO). IEEE, 2015. (Year: 2015).

* cited by examiner

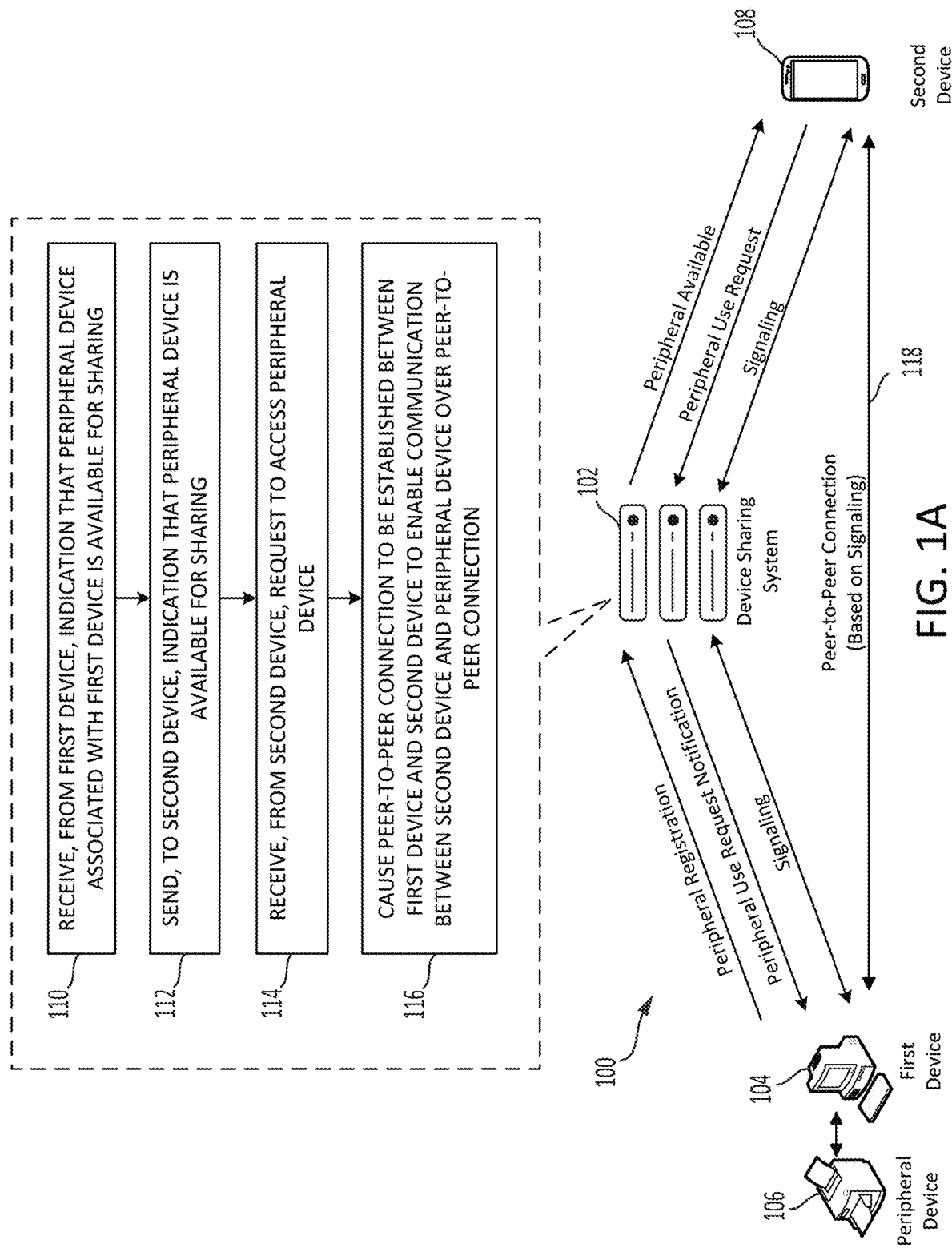

# PERHIPHERAL DEVICE SHARING OVER PEER-TO-PEER CONNECTION

CROSS-REFERENCE TO RELATED APPLICATIONS

This application is a continuation of and claims the benefit under 35 U.S.C. § 120 to application Ser. No. 16/585,119, entitled PERIPHERAL DEVICE SHARING OVER PEER-TO-PEER CONNECTION, filed Sep. 27, 2019, which is a continuation of and claims the benefit under 35 U.S.C. § 120 and 35 U.S.C. § 365(c) to International Application PCT/CN2019/105057, entitled PERIPHERAL DEVICE SHARING OVER PEER-TO-PEER CONNECTION, with an international filing date of Sep. 10, 2019, the entire contents of each of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a computing system performs a method that involves receiving, from a first device, a first indication that a peripheral device associated with the first device is available for sharing; sending, to a second device, a second indication that the peripheral device is available for sharing; receiving, from the second device, a request to access the peripheral device; and based at least in part on receipt of the request, causing a peer-to-peer connection to be established between the second device and the first device, the peer-to-peer connection enabling communication between the second device and the peripheral device. The peer-to-peer connection may, for example, enable direction of the peripheral device to the second device so that the peripheral device is a virtual device of the second device.

In other embodiments, a first device includes at least one processor and at least one computer-readable medium. The at least one computer readable-medium is encoded with instructions which, when executed by the at least one processor, cause the first device to send, to a computing system, a first indication that a peripheral device associated with the first device is available for sharing; to receive, from the computing system, a second indication that a second device has requested access to the peripheral device; to establish a peer-to-peer connection between the first device and the second device based at least in part on receipt of the second indication; and to communicate data between the peripheral device and the second device over the peer-to-peer connection.

In still other embodiments a second device includes at least one processor and at least one computer-readable medium. The at least one computer-readable medium is encoded with instructions which, when executed by the at least one processor, cause the first device to receive, from a computing system, an indication that a peripheral device associated with a first device is available for sharing; to send, to the computing system, a request to access to the peripheral device; to establish a peer-to-peer connection between the first device and the second device, and to communicate with the peripheral device over the peer-to-peer connection.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1A is a first diagram illustrating an example system for sharing a peripheral device over a peer-to-peer connection between first and second devices in accordance with some embodiments of the present disclosure and, in particular, focusing on example operations that may be performed by a device sharing system that interacts with the first and second devices;

DETAILED DESCRIPTION

Figure 1B:
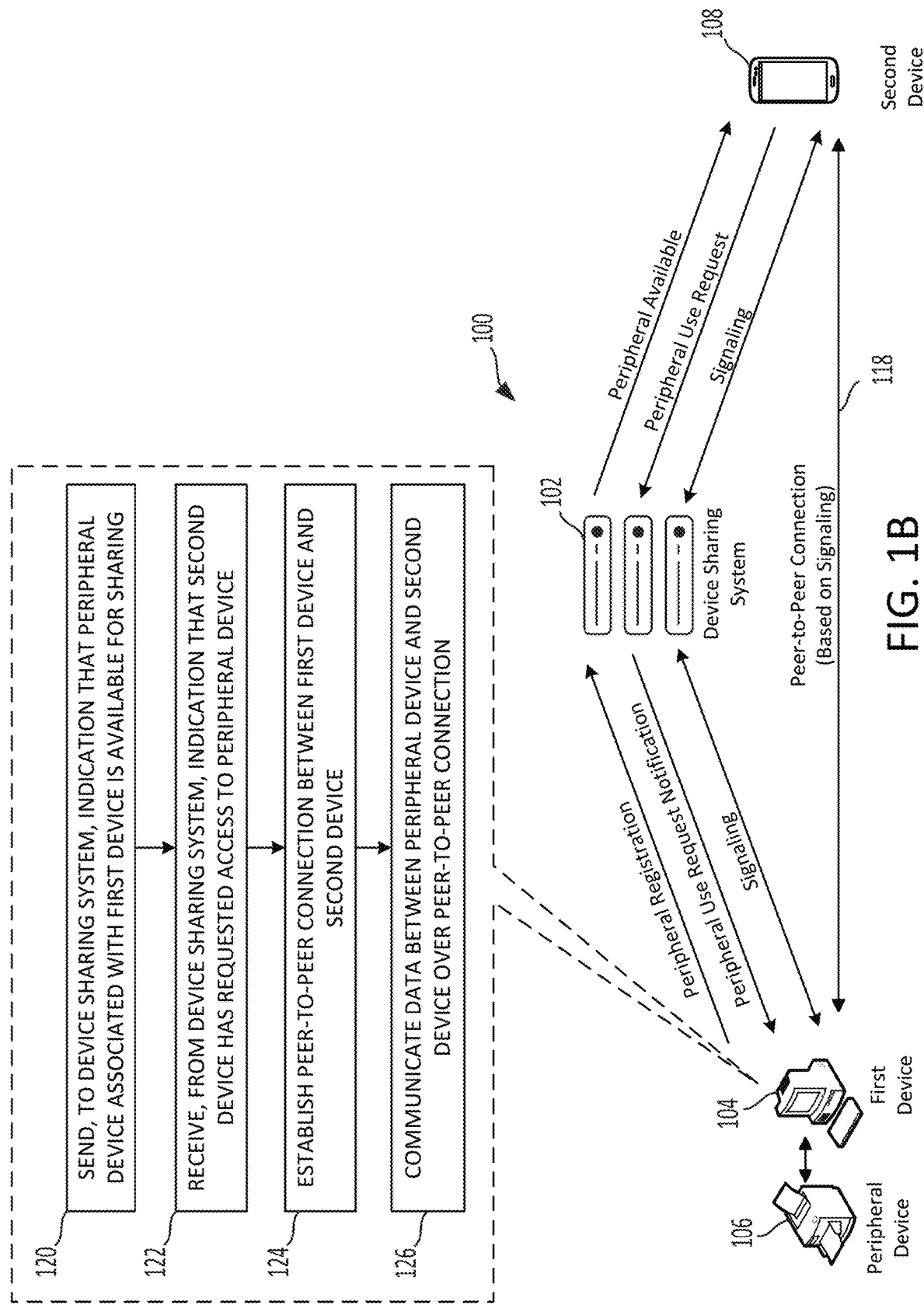
FIG. 1B is a second diagram illustrating the example system shown in FIG. 1A but instead focusing on example operations that may be performed by the first device (which is associated with the peripheral device that is being shared)

For purposes of reading the description of the various embodiments below, the following descriptions of the sections of the specification and their respective contents may be helpful:

Section A provides an introduction to example embodiments of systems for sharing a peripheral device over a peer-to-peer connection;

Section B describes a network environment and computing environment which may be useful for practicing embodiments described herein;

Section C describes embodiments of systems and methods for delivering shared resources using a cloud computing environment;

Section D describes embodiments of systems and methods for managing and streamlining access by clients to a variety of resources;

Section E provides a detailed description of example embodiments of systems for sharing a peripheral device over a peer-to-peer connection; and Section F describes example implementations of methods, systems/devices, and computer-readable media in accordance with the present disclosure.

A. Introduction to Illustrative Embodiments of a System for Sharing a Peripheral Device Over a Peer-to-Peer Connection The inventors have recognized and appreciated that there may be circumstances in which a user desires to access a peripheral device (e.g., a camera, printer, etc.) that is accessible by a first device but is not accessible by a second device the user is currently operating. For example, a user operating a smartphone may want to access a printer connected to a workstation, or a user of a workstation may want to access a camera of a smartphone. In existing systems, no mechanism is provided for allowing a user of a first client device to identify peripheral devices of one or more other client devices that are available for sharing and/or permitting such a user to access such peripheral devices on-demand using the first client device.

Offered is a system in which a peripheral device associated with a first device may be registered with a central authority as being available for use by other devices. In some embodiments, a user of the first device may, when registering a peripheral device with the central authority, additionally specify one or more particular individuals and/or one or more specific devices that are to be permitted to access the registered peripheral device on demand. The central authority may then indicate to the device(s) operated by the designated individuals and/or the specific designated devices that the peripheral device is available for sharing. For example, a device operated by a user authenticated to a computing system capable of delivering one or more remote desktops, applications, or other data may display a list of registered peripheral devices the user-authenticated device is permitted to access, in addition to the other resources that can be accessed via the computing system. In response to the user selecting an available peripheral device, the central authority may cause the device currently operated by the user to establish a peer-to-peer connection with the device capable of accessing the peripheral device, and the currently-operated device may then access the selected peripheral device over the established peer-to-peer connection.

In other embodiments, the user of the first device may register the peripheral device with the central authority without specifying one or more other individuals and/or other devices that are to be permitted to access the peripheral device. In some such embodiments, the central authority may identity registered peripheral devices to other user devices, and may receive and process requests from such other user devices for permission to access selected ones of the registered peripheral devices. For instance, the central authority may require authorization by the user that registered the peripheral device and/or a system administrator before allowing other user devices and/or individuals to access a given registered peripheral device. In other implementations, the central authority may allow other user devices to access registered peripheral devices without requiring authorization by another user or a system administrator. When access permission has been granted (or is not required), the central authority may cause the device currently operated by the requesting user to establish a peer-to-peer connection with the device capable of accessing the peripheral device, and the currently-operated device may then access the selected peripheral device over the established peer-to-peer connection.

Figure 1C:
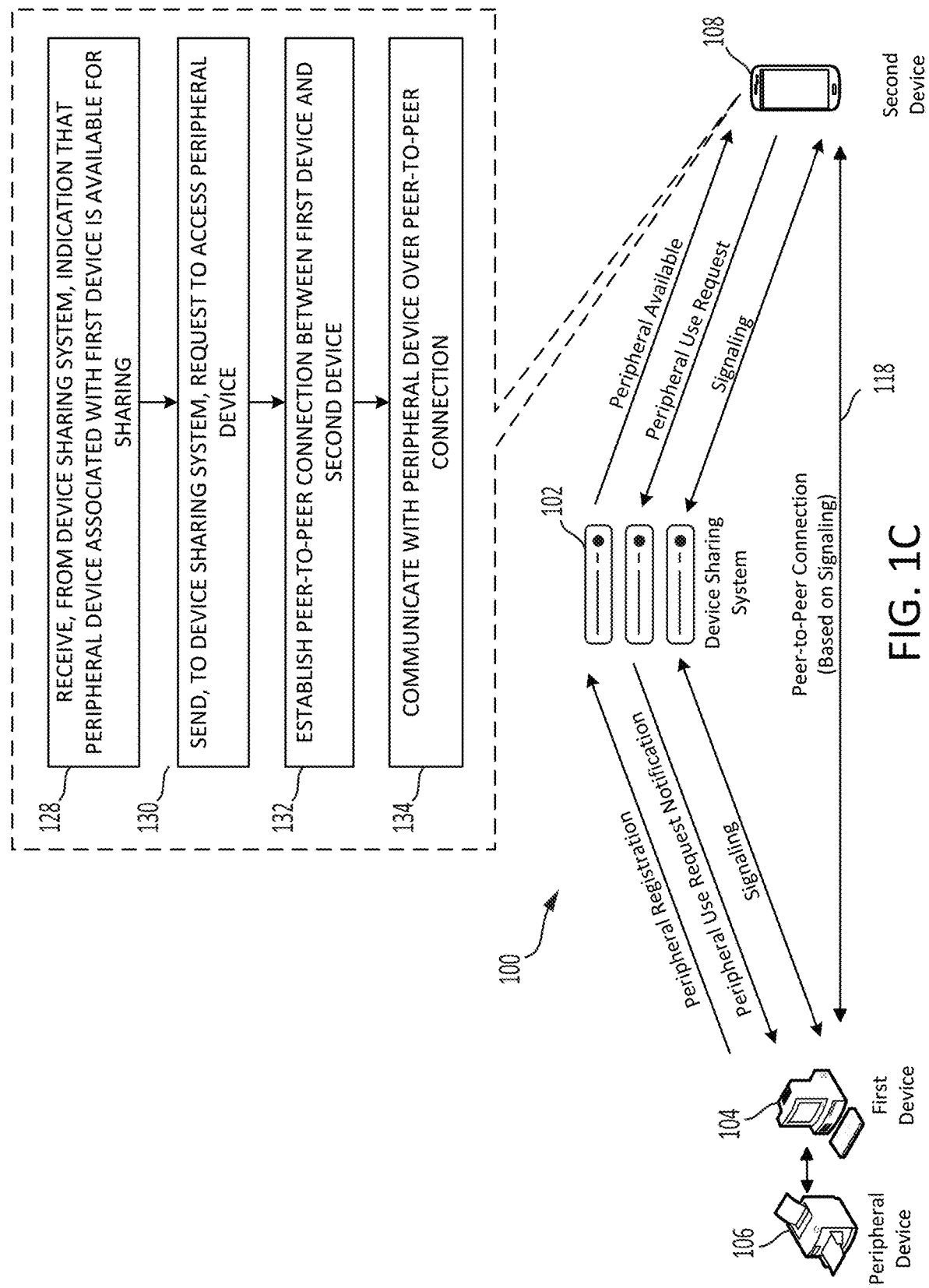
FIG. 1C is a third diagram illustrating the example system shown in FIG. 1A but instead focusing on example operations that may be performed by the second device (which is permitted to access the peripheral device over the peer-to-peer network)

FIGS. 1 A-C illustrate an example configuration of a system 100 that may be used to implement various aspects of the present disclosure. As shown, the system 100 may include a device sharing system 102, a first device 104 with an associated peripheral device 106, and a second device 108. Although the illustrated example shows the device sharing system 102 as including just three servers, it should be appreciated that the device sharing system 102 may include any number of servers (including only a single server) as well as any number of additional or different components, such as one or more databases, other network components, etc. Although not illustrated in FIGS. 1A-C, it should be appreciated that the device sharing system 102, the first device 104, and the second device 108 may be interconnected via a wide area network (such as the Internet), one or more local area networks, and/or one or more other network types, as described in more detail below.

FIGS. 1A-C illustrate, respectively, examples of routines that may be executed by the device sharing system 102, the first device 104, and the second device 108 to perform embodiments of the novel techniques for peer-to-peer device sharing disclosed herein.

As shown in FIG. 1A, the device sharing system 102 may (at a step 110) receive one or more messages from the first device 104 indicating that the peripheral device 106 is available for sharing. In some embodiments, for example, a user of the first device 104 may operate a user interface of the first device 104 to select the peripheral device 106 and indicate a desire to register the peripheral device with the device sharing system 102 as a "shared" device. In some embodiments, the user may also be given the ability to specify one or more particular individuals and/or one or more specific devices with whom and/or with which the peripheral device is to be made accessible. A user of the first device 104 may, for example, indicate that only that same user is to be allowed to access the peripheral device 106 from another device and/or that only a specific device, e.g., the second device 108, is to be provided with such access. In other examples, the user of the first device 104 may additionally or alternatively indicate that one or more other individuals and/or other devices are to be permitted to access the peripheral device 106. In some embodiments, the device sharing system 102 may provide a virtual workspace environment to the first device 104 and the second device 108, as well as many more devices associated with a business or other enterprise. The Citrix Workspace™ and Citrix Virtual Apps and Desktops™, by Citrix Systems, Inc., of Fort Lauderdale, Fla., are examples of computing systems capable of providing such an environment.

Once the peripheral device 106 has been registered with the device sharing system 102, the device sharing system 102 may (at a step 112) send one or more messages to the second device 108 indicating the availability of the peripheral device 106. In some embodiments, such messages may be sent to the second device 108 in response to the peripheral device 106 being registered with the device sharing system 102. In other embodiments, such messages may be sent in response to receiving a request for a list of available peripheral devices from the second device 108. In some implementations, for example, a user interface of the second device 108 may present the user with a list of peripheral devices to which the user and/or the second device 108 has been granted access privileges. In embodiments in which the device sharing system 102 provides a virtual workspace environment to the first device 104 and the second device 108, for example, the lists of available desktops, applications, etc., presented on the second device 108 may further include one or more lists of accessible peripheral devices, and possibly also a designation of the client devices with which such peripheral devices are associated. In other embodiments, the user interface of the second device 108 may present the user with a list of peripheral devices that have been registered with the device sharing system 102 but to which the second device 108 may not yet have been granted access privileges.

As further shown in FIG. 1A, the device sharing system 102 may (at a step 114) receive a request from the second device 108 indicating a desire to access the peripheral device 106. Such a request may be generated, for example, in response to a user of the second device 108 (which may be the same user or a different user than the user of the first device 104) operating the user interface of the second device 108 to select a listed sharable device and indicating a desire to access the same.

After receiving a request to access the peripheral device 106, the device sharing system 102 may (at a step 116) cause a peer-to-peer connection 118 to be established between the first device 104 and the second device 108. In some embodiments, the device sharing system 102 may also take one or more additional steps to determine whether to allow the second device 108 to access the peripheral device 106 prior to causing the peer-to-peer connection 118 to be established. For example, in implementations in which the second device 108 and/or the user of the second device 108 has not already been granted access privileges for the peripheral device 106, the device sharing system 102 may seek authorization by the user of the first device 104 and/or a system administrator prior to allowing the second device 108 to access the peripheral device 106 over the peer-to-peer connection 118.

In some embodiments, to cause the peer-to-peer connection 118 to be established, the device sharing system 102 may coordinate the exchange of signaling messages between the first device 104 and the second device 108. Such signaling messages may, for example, identify network configuration parameters (e.g., internet protocol (IP) addresses and ports), identify data handling capabilities of the first device 104 and the second device 108 (e.g., CODECs and resolutions that can be handled by software executing on the respective devices), and allow session control of the peer-to-peer connection 118 (e.g., to initialize or close communication, report errors, etc.). In some embodiments, the peer-to-peer connection 118 may be established using the RTCPeerConnection application programing interface (API) of the WebRTC platform and the signaling messages may be processed using the offer/answer architecture of the JavaScript Session Establishment Protocol (JSEP). JSEP is described in "JavaScript Session Establishment Protocol, draft-ietf-rtcweb-jsep-26," published by the Internet Engineering Task Force (IETF), and is accessible at www.tools.ietf.org at the path "html/draft-ietf-rtcweb-jsep-26," the entire contents of which are incorporated herein by reference. Further details concerning example processes for signaling and establishing the peer-to-peer connection 118 are provided below. Once the peer-to-peer connection 118 has been established, the peripheral device 106 may be directed to the second device 108 (in lieu of or in addition to being directed to the first device 104) so that the peripheral device 106 may operate as a virtual device of the second device 108 (in lieu of or in addition to operating as a peripheral device of the first device 104).

FIG. 1B shows example steps that may be performed by the first device 104 to implement certain of the novel peer-to-peer device sharing techniques disclosed herein. As shown, at a step 120, the first device 104 may engage in a registration process with the device sharing system 102 during which the first device 104 may send the device sharing system 102 an indication that the peripheral device 106 is available for sharing. The indication sent at the step 120 may, in some embodiments, identify one or more particular individuals and/or one or more specific devices with whom and/or with which the peripheral device is to be made accessible. In other embodiments, the indication may cause the peripheral device 106 to be registered with the device sharing system 102 without specifying one or more other individuals and/or other devices that are to be permitted to access the peripheral device 106.

At a step 122, the first device 104 may be notified by the device sharing system 102 that the second device 108 has requested access to the peripheral device 106. After receiving such notification, the first device 104 (at a step 124) may establish the peer-to-peer connection 118, such as by employing a signaling protocol as disclosed herein. As noted above, in some implementations, the notification received from the device sharing system 102 may additionally request the user of the first device 104 to authorize access to the peripheral device 106 by the second device 108 and/or the operator of the second device 108. Such an authorization step may, for example, be employed in embodiments in which one or more particular individuals and/or specific user devices were not identified as being permitted to access the peripheral device 106 at the time of registration (e.g., at the step 120). At a step 126, the first device 104 may communicate data between the peripheral device 106 and the second device 108 over the peer-to-peer connection 118. The peripheral device 106 may thus be directed to the second device 108 (in lieu of or in addition to being directed to the first device 104) so that the peripheral device 106 may operate as a virtual device of the second device 108 (in lieu of or in addition to operating as a peripheral device of the first device 104).

FIG. 1C shows example steps that may be performed by the second device 108 to implement certain of the novel peer-to-peer device sharing techniques disclosed herein. As shown, at a step 128, the second device 108 may receive one or more messages from the device sharing system 102 indicating that the peripheral device 106 is available for sharing. As noted above, in some implementations, such message(s) may be received by the second device 108 either in response to the peripheral device 106 being registered with the device sharing system 102, or in response to a request the second device sent to the device sharing system 102 to obtain a list of available peripheral devices. As also noted above, in some embodiments, the received message(s) may indicate that the peripheral device 106 is currently accessible to the second device 108. In other embodiments, such message(s) may simply indicate that the peripheral device 106 has been registered with the device sharing system 102, but may not necessarily indicate that the peripheral device 106 is currently accessible to the second device 108.

At a step 130, the second device 108 may send the device sharing system 102 a request to access the peripheral device 106. The second device 108 may then (at a step 132) establish the peer-to-peer connection 118, such as by employing a signaling protocol as disclosed herein. At a step 134, the second device 108 may communicate with the peripheral device 106 over the peer-to-peer connection 118 so that the peripheral device 106 may operate as a virtual device of the second device 108.

Additional details and example implementations of embodiments of the present disclosure are set forth below in Section E, following a description of example systems and network environments in which such embodiments may be deployed.

B. Network and Computing Environment

Figure 2A:
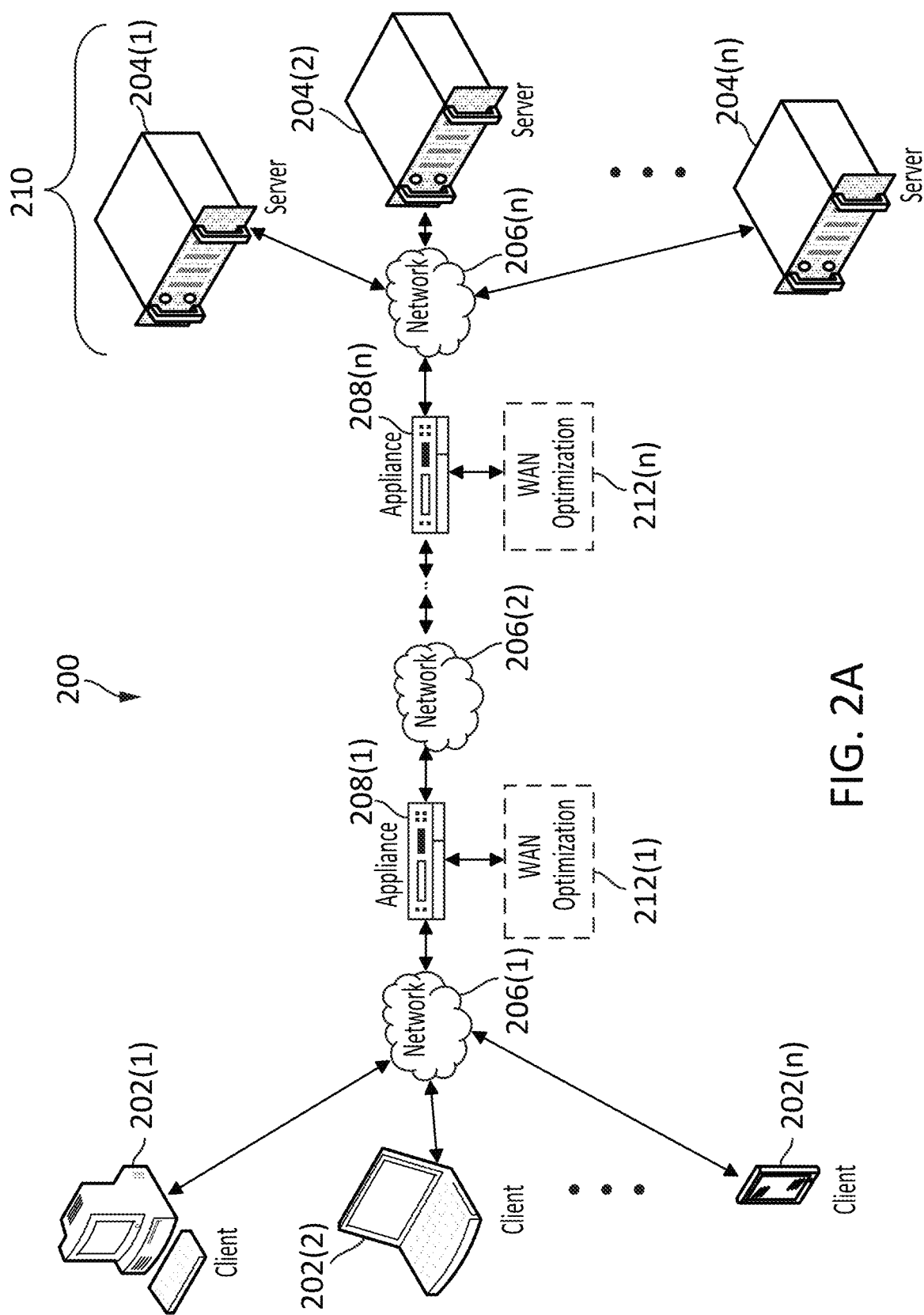
FIG. 2A is a diagram of a network computing environment in which some embodiments of the peripheral device sharing techniques disclosed herein may deployed.

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 204 may include one or more wireless local-area networks (WLANs). For short range communications within a WLAN, clients 202 may communicate using 802.11, Bluetooth, and/or Near Field Communication (NFC).

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
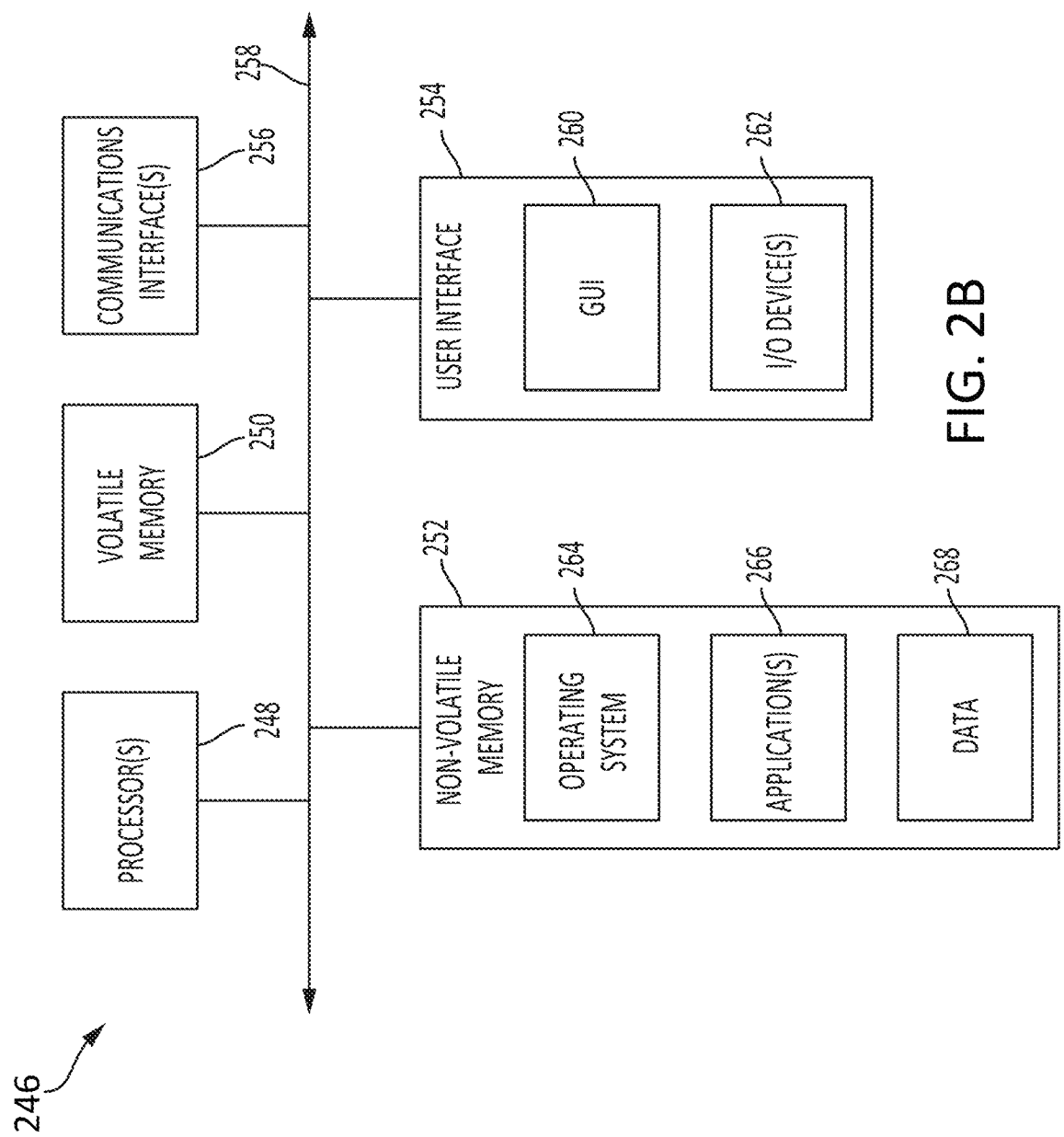
FIG. 2B is a block diagram of a computing system that may be used to implement one or more of the components of the computing environment shown in FIG. 2A in accordance with some embodiments.

FIG. 2B illustrates an example of a computing system 246 that may be used to implement one or more of the respective components (e.g., the clients 202, the servers 204, the appliances 208, 212) within the network environment 200 shown in FIG. 2A. As shown in FIG. 2B, the computing system 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computing system 246 may communicate via communication bus 258. The computing system 246 as shown in FIG. 2B is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computing system 246 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 3:
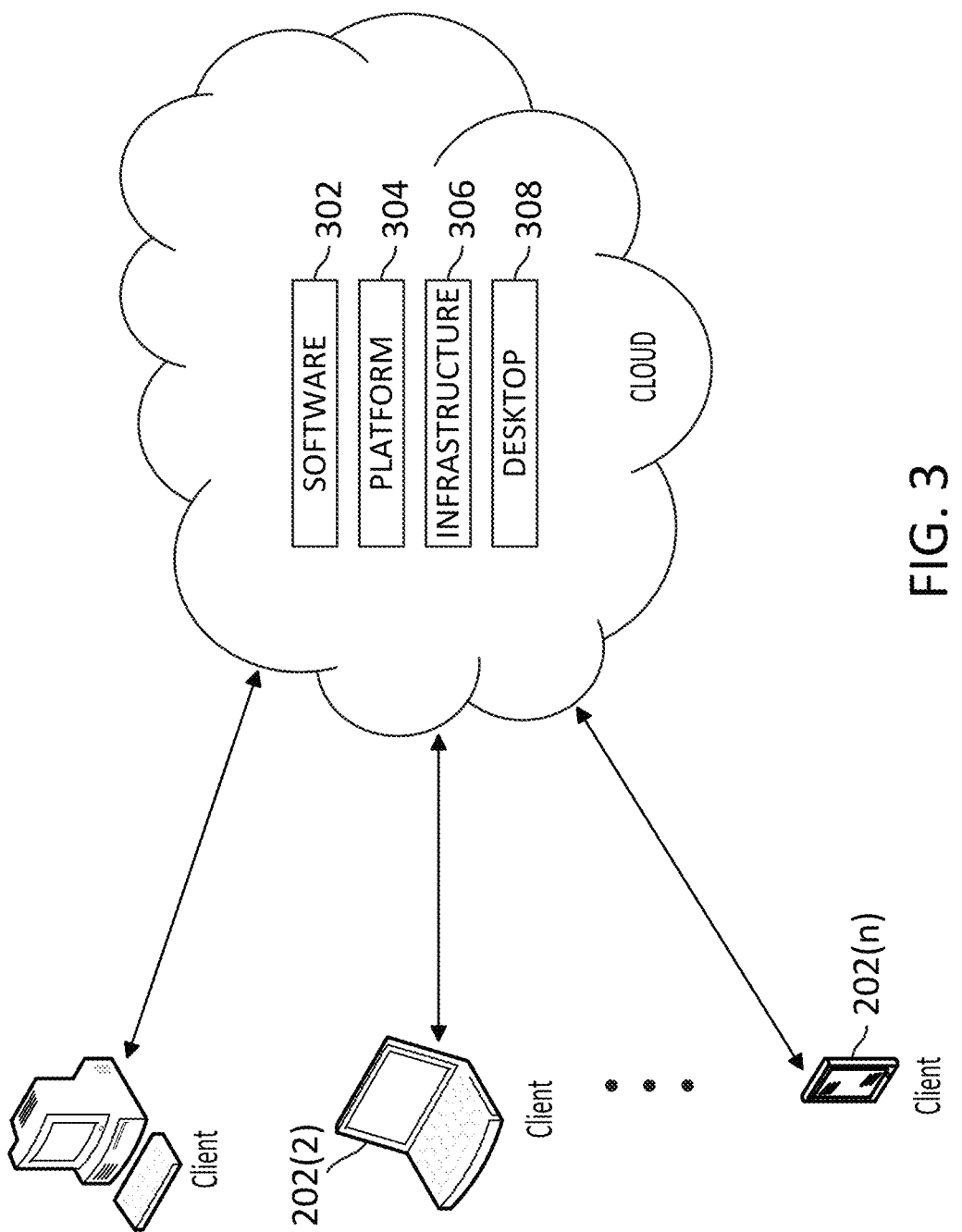
FIG. 3 is a schematic block diagram of a cloud computing environment in which various aspects of the disclosure may be implemented.

C. Systems and Methods for Delivering Shared Resources Using a Cloud Computing Environment Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 202 (such as those described above) are in communication with a cloud network 304. The cloud network 304 may include back-end platforms, e.g., servers, storage, server farms and/or data centers. The clients 202 may correspond to a single organization/tenant or multiple organizations/tenants. More particularly, in one example implementation, the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 202 or the enterprise/tenant. The servers may be located off-site in remote geographical locations or otherwise.

The cloud computing environment 300 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 202. In some embodiments, the cloud computing environment 300 may include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 302, Platform as a Service (PaaS) 304, Infrastructure as a Service (IaaS) 306, and Desktop as a Service (DaaS) 308, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

Figure 4A:
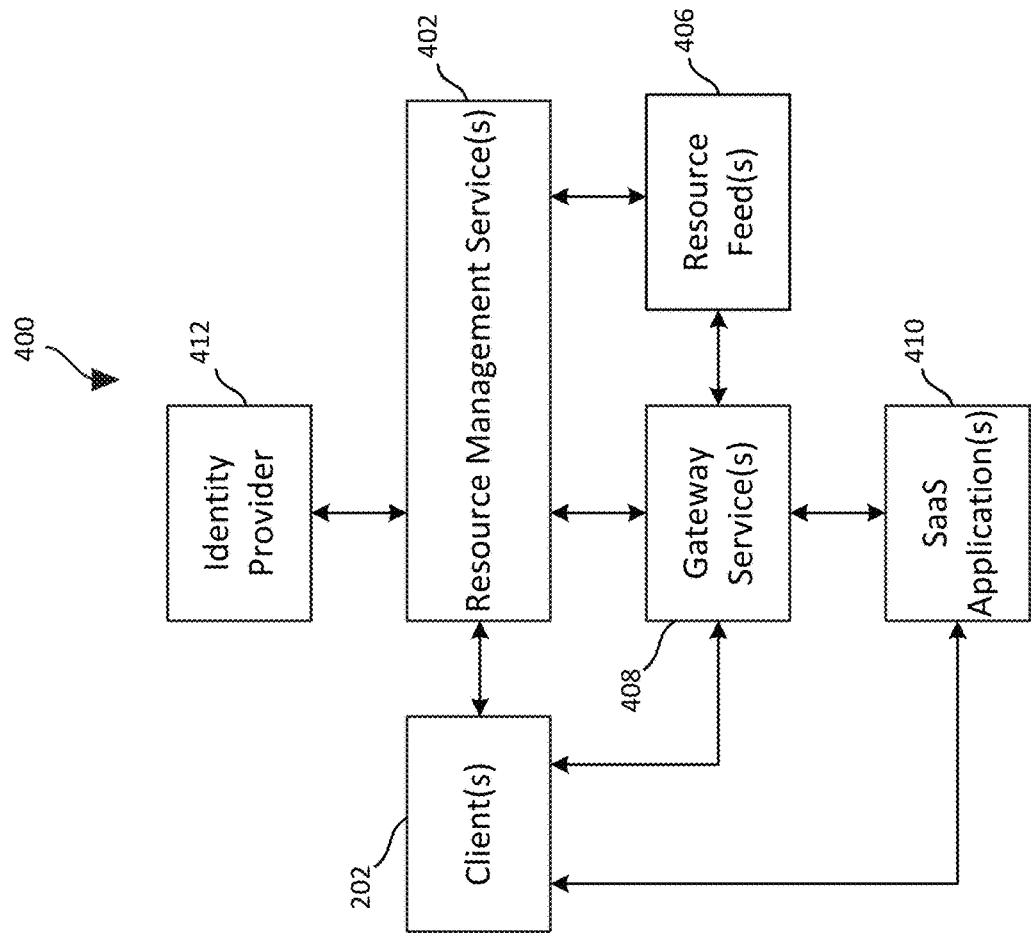
FIG. 4A is a block diagram of an example system in which resource management services may manage and streamline access by clients to resource feeds (via one or more gateway services) and/or software-as-a-service (SaaS) applications.

D. Systems and Methods for Managing and Streamlining Access by Client Devices to a Variety of Resources FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
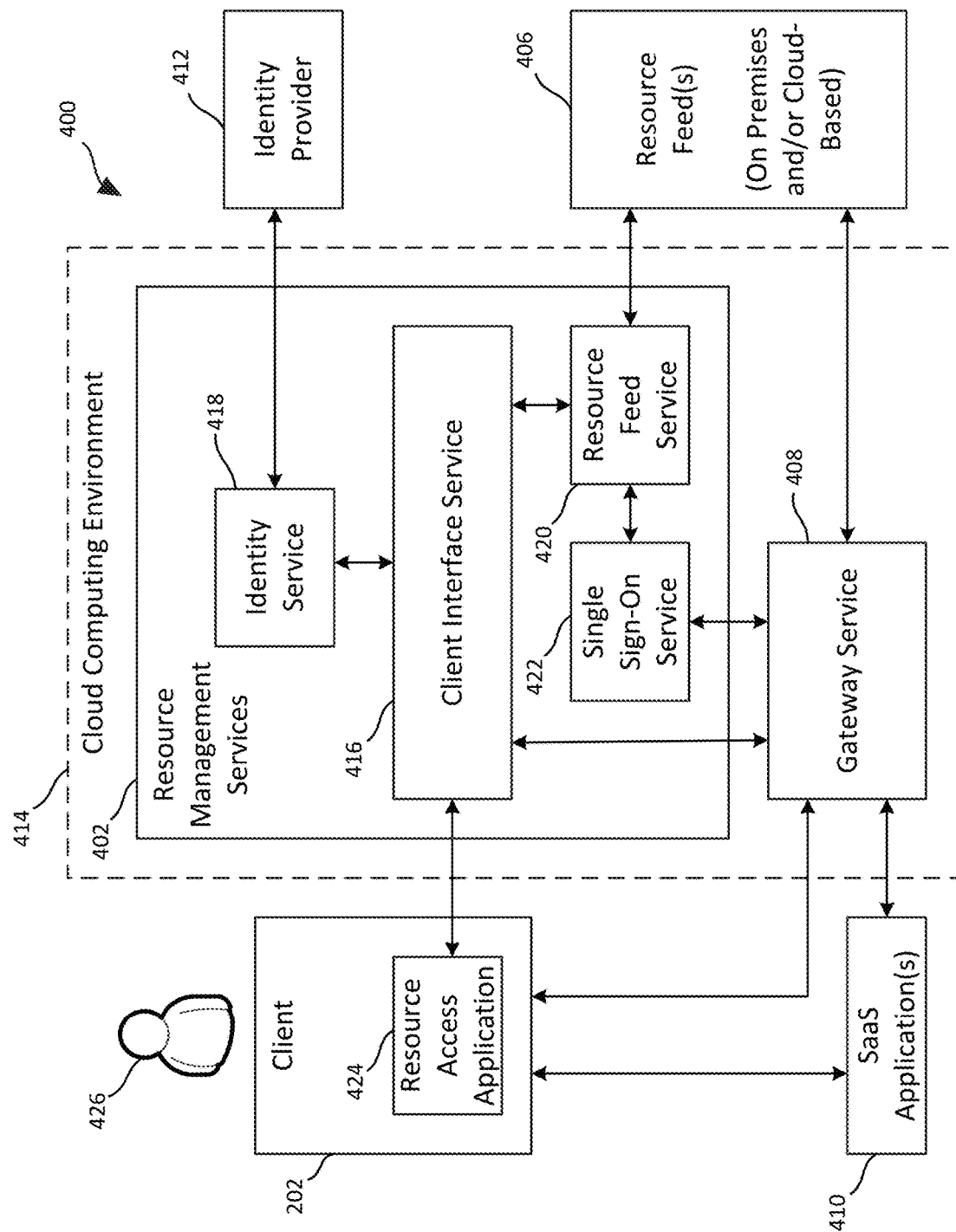
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more interne enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
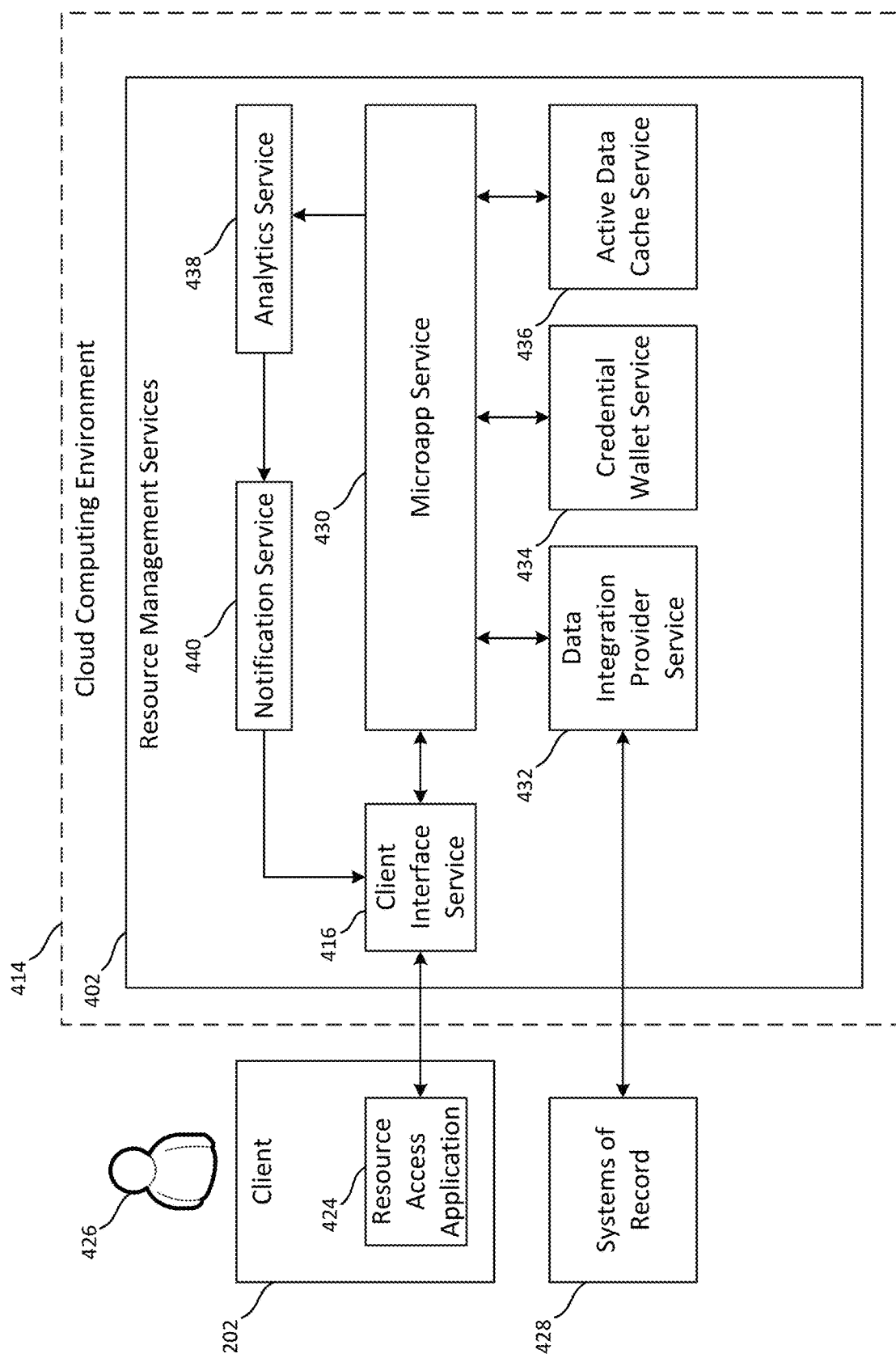
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Ouath2 token. The data integration provider service 432 may then decrypt the Oauth2 token and write the action to the appropriate system of record under the identity of the user 426. The data integration provider service 432 may then read back changed data from the written-to system of record and send that changed data to the microapp service 430. The microapp service 430 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams.

Figure 5:
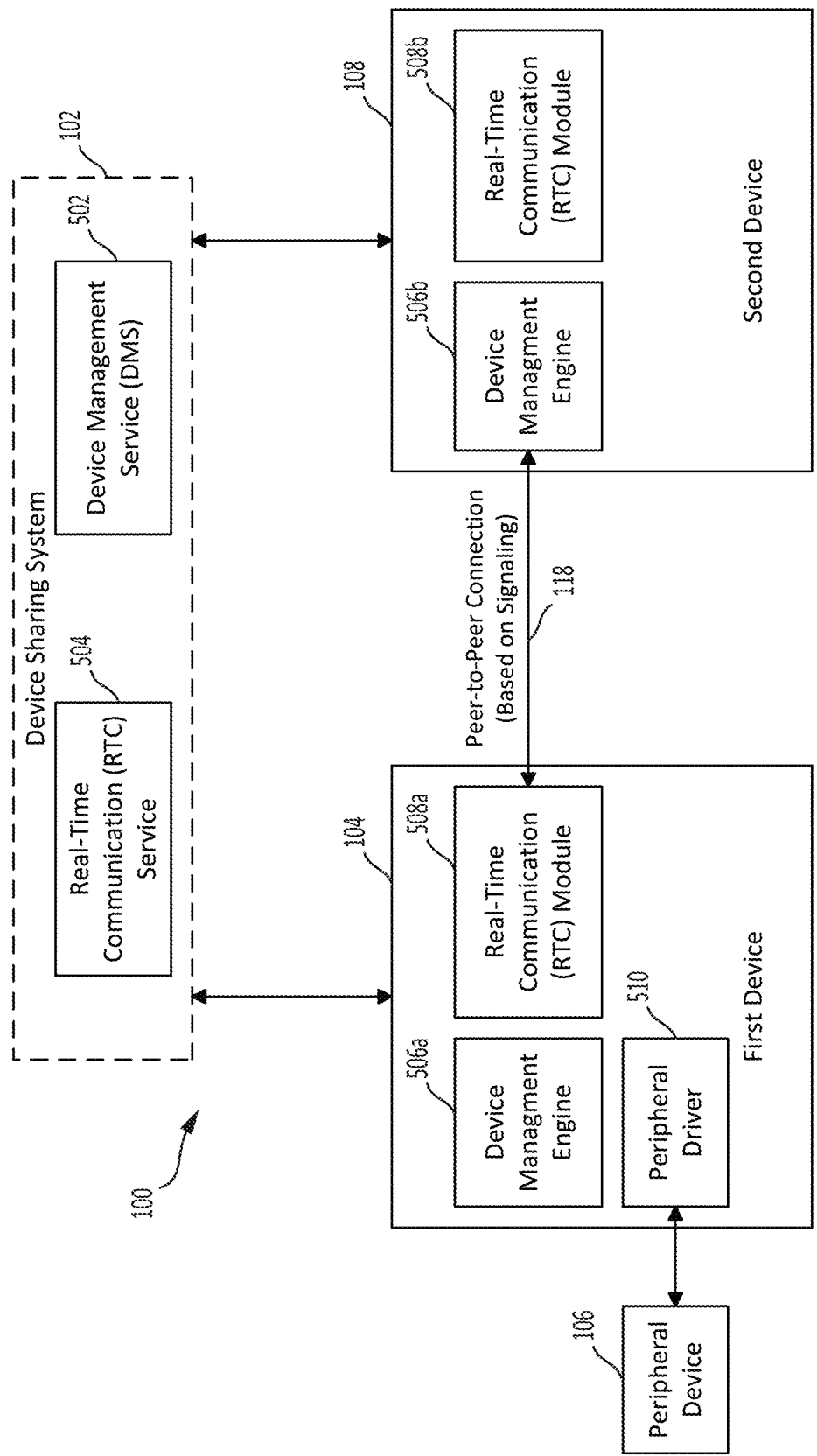
FIG. 5 is block diagram showing additional details of the example system for sharing a peripheral device illustrated in FIGS. 1A-C in accordance with some embodiments.

E. Detailed Description of Example Embodiments of System for Sharing a Peripheral Device Over a Peer-to-Peer Connection FIG. 5 shows additional details of the example implementation of the system 100 for sharing a peripheral device over a peer-to-peer connection introduced above in connection with FIGS. 1A-C. In the illustrated system, the first device 104 and the second device 108 may each be a computing system configured like the computing system 246 shown in FIG. 2B. The device sharing system 102 may likewise be embodied by one or more such computing systems. The first device 104 and the second device 108 may, for example, each correspond to any one the clients 202 described above, and the device sharing system 102 may correspond to or operate in conjunction with one or more of the server(s) 204 (shown in FIG. 2A), one or more of the cloud-based based services 308, 312, 316, 320 (shown in FIG. 3), and/or one or more of the services 402, 416, 408, 410 (shown in FIGS. 4A-C) that provide the described functionality for those clients 202.

As shown, the device sharing system 102 may include a device management service (DMS) 502 and a real-time communication (RTC) service 504. Each of the services 502, 504 may be provided by one or more servers 204, and may be embodied either by different servers 204 or by the same server 204. In some embodiments, the services 502 and 504 may be provided in a cloud computing environment, together with other services. In some embodiments, for example, the device sharing system 102 may be included among the resource management services 402 provided in the cloud computing environment 414 discussed above in connection with FIGS. 4A-C. Examples of operations that may be performed by the DMS 502 and RTC service 504 are described below in connection with FIGS. 8 and 9, respectively.

As FIG. 5 illustrates, the first device 104 and the second device 108 may each include a device management engine 506a, 506b and a real-time communication (RTC) module 508a, 508b. Examples of operations that may be performed by the device management engines 506 are described below in connection with FIG. 6. In some embodiments, the first device 104 may additionally include a peripheral driver 510 to provide a software interface to the hardware components of the peripheral device 106.

In some embodiments, the RTC modules 508a, 508b may each include one or more APIs for enabling real-time communications between the second device 108 and the peripheral device 106. In some implementations, for example, the RTC modules 508a, 508b may each include one or more WebRTC APIs. WebRTC is a platform that provides browsers and other applications with real-time communications capabilities via simple APIs. Information concerning WebRTC can be found at www.webrtc.org, the entire contents of which are incorporated herein by reference. The WebRTC APIs are defined in two specifications accessible at www.w3.org, including "WebRTC 1.0: Real-time Communication Between Browsers," available at the path TR/webrtc/" and "Media Capture and Streams," available at the path TR/mediacapture-streams/," the entire contents of each of which are incorporated herein by reference. In some implementations, either or both of the RTC modules 508a, 508b may be included within a browser. WebRTC is currently available in both desktop and mobile versions of Google Chrome, Safari, Firefox and Opera browsers.

In some implementations, for example, the device management engine 506a may be executed by a Web server (not shown in FIG. 5) and accessed using the same web browser that embodies the RTC module 508a. The device management engine 506b may likewise be executed by a Web server and accessed using the same web browser that embodies the RTC module 508b. In some embodiments, for example, the Web server(s) that execute one or both of the device management engines 506a, 506b may be included within the device sharing system 102 which, as noted above, may be included among the resource management services 402 described above in connection with FIGS. 4A-C.

In other embodiments, either or both of the device management engines 506a, 506b may be embodied by software components on the respective devices 104, 108. In some embodiments, for example, either or both of the device management engines 506a, 506b may be included within a client-based application, such as the resource access application 424 described above in connection with FIGS. 4B and 4C. In some embodiments, either or both of the RTC modules 508a, 508b may additionally or alternatively be included within a client-based application other than a browser. In some implementations, for example, the pertinent WebRTC APIs may be included within the resource access application 424 described above in connection with FIGS. 4B and 4C.

Figure 6:
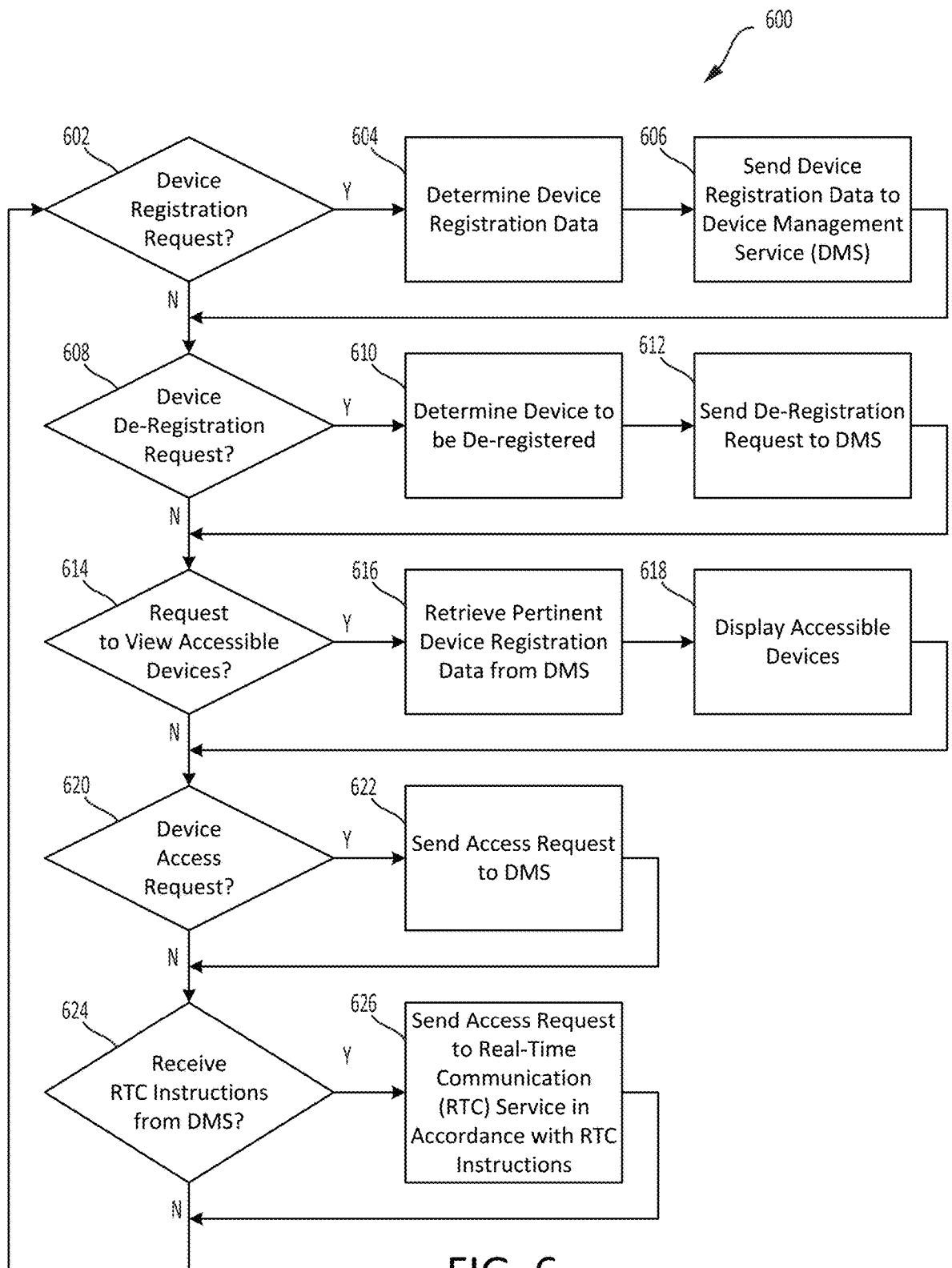
FIG. 6 shows an example routine that may be executed by each of the device management engines shown in FIG. 5 in accordance with some embodiments.

FIG. 6 shows an example routine 600 that may be executed by each of the device management engines 506a, 506b, wherever those engines happen to be executed, in accordance with some embodiments. Each of the device management engines 506 may, for example, be embodied by a computing system including one or more processors and one or more computer-readable media encoded with instructions which, when executed by the one or more processors, cause the computing system to perform the routine 600.

Figure 7:
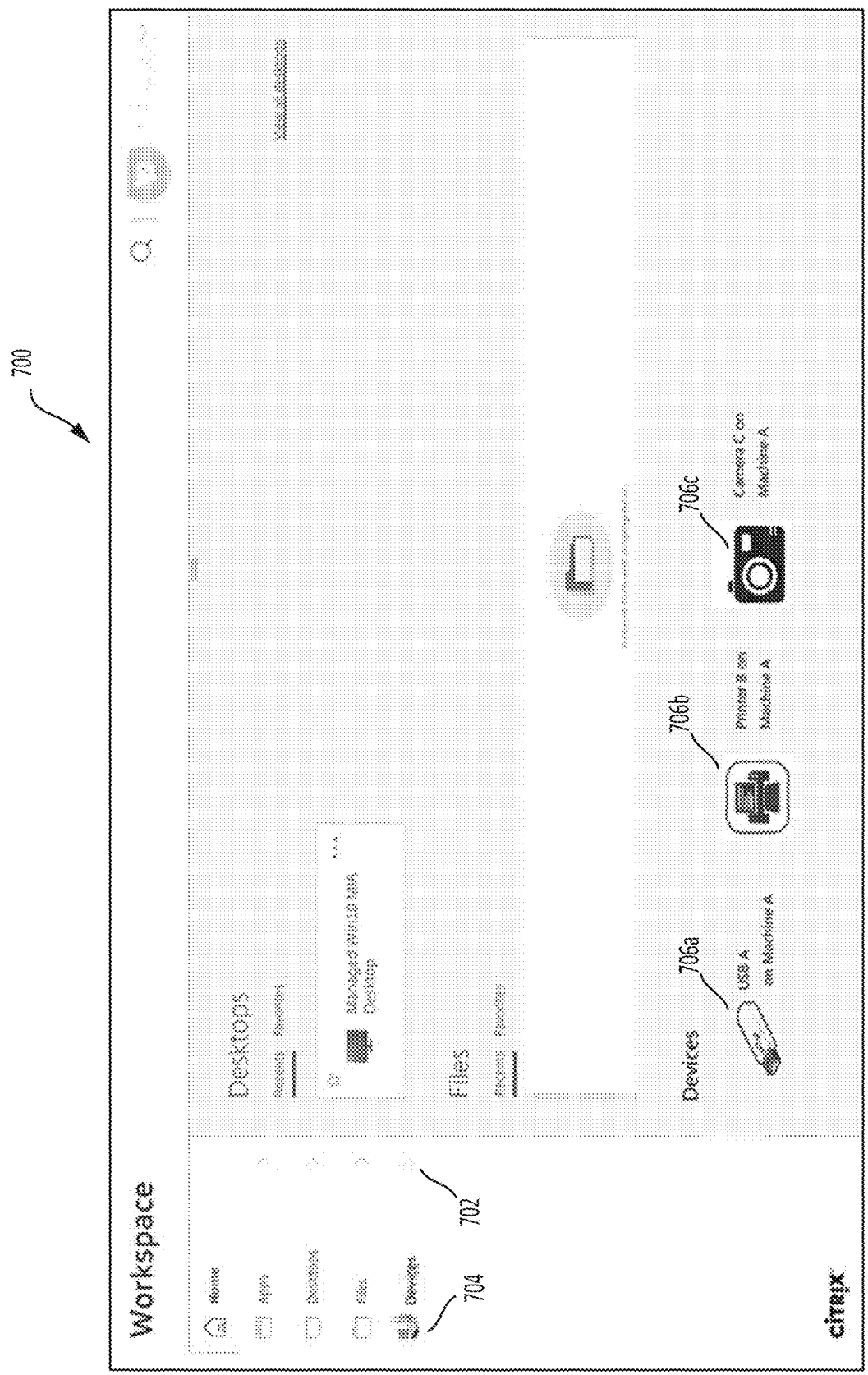
FIG. 7 illustrates an example user interface that may be presented on either of the first and second devices shown in FIGS. 1A-C and 5 in accordance with some embodiments.

As indicated previously, each of the device management engines 506 may be included among other components of a resource access application 424 (shown in FIGS. 4B-C). In some embodiments, the first device 104 and the second device 108 may operate such device management engines 506a, 506b, as well as other software components for managing and/or accessing other resources, only after a user of the device has authenticated that user's identity to the system, e.g., via an identity service such as the identity service 418 shown in FIG. 4B. FIG. 7 illustrates an example user interface 700 that may be presented on a client device following user authentication to identify peripheral devices that are available for sharing, as well as applications, desktops, and files that are also made accessible via a resource access application 424. The routine 600 illustrates examples of steps that may be performed to manage and allow access to one or more peripheral devices such as those identified in FIG. 7.

As shown in FIG. 6, at a step 602 of the routine 600, a determination may be made as to whether a request to register a peripheral device with the device sharing system 102 has been received. A user of the first device 104 may, for example, manipulate the user interface 700 in some manner to indicate that the peripheral device 106 is to be made available for sharing. In some embodiments, for example, the user may click on, or otherwise select, an expansion indicator 702 adjacent a "device" icon 704 on the left-hand side of the user interface 700 and then select a "register new device" option, e.g., from a dropdown menu or otherwise. When a device registration request is received (at the step 602), the routine 600 may proceed to a step 604, at which a process for determining device registration data may be invoked. To determine the device registration data, the user may, for example, navigate a menu of devices enrolled with the operating system of the first device 104 and select a particular device the user wishes to register with the device sharing system 102. An identifier of the selected device as well as pertinent operational parameters for that device may then be retrieved and included in device registration data to be sent to the DMS 502 (at a step 606).

The device registration data may additionally include an identifier of the first device 104 with which the selected peripheral device is associated. In some embodiments, in addition to selecting the device to be shared, the user may additionally identify one or more individuals with whom the user desires to make the peripheral device 106 available for sharing. For any individuals so identified (which may include the same user and/or one or more different users), the identified peripheral device may subsequently be made accessible by such individuals when they authenticate their identity to the device sharing system 102 or to a larger system of which the device sharing system is a component, e.g., the resource management services 402 shown in FIGS. 4A-C. Further, in addition to or in lieu of identifying one or more individuals with whom the peripheral device 106 is to be shared, the user of the first device 104 may identify one or more specific client devices on which the peripheral device 106 is to be made accessible. For example, the user of the first device 104 may specify that the peripheral device 106 is to be made accessible only by the second device 108. In other embodiments, the device registration data may not identify any individuals or particular devices with which the peripheral device 106 is to be shared. For example, as explained below, in some implementations, users accessing the device sharing system 102 may be presented with a list of all peripheral devices that have been registered with the device sharing system 102 as being available for sharing, and may need to obtain authorization to access a given registered peripheral device (e.g., from the user who registered the peripheral device and/or a system administrator) before being allowed to access it, or instead may simply be allowed to access any peripheral device that has been registered as being available for sharing.

The determined device registration data, which in some embodiments may include the identity of the selected peripheral device (e.g., the peripheral device 106), the identity of the client device with which the selected peripheral device is associated (e.g., the first device 104), any pertinent operational parameters of the selected peripheral device and/or its device driver (e.g., the peripheral device 106 and/or the peripheral driver 510), any identified authorized users (e.g., a user of the second device 108), and any identified authorized client devices (e.g., the second device 108), may then be sent (at the step 606) to the DMS 502. As noted previously, example operations performed by the DMS 502 are described below in connection with FIG. 8.

At a step 608 of the routine 600, a determination may be made as to whether a request to de-register a peripheral device from the device sharing system 102 has been received. Upon detecting a de-registration request, a process (step 610) may be invoked for determining the device that is to be de-registered. A user of the first device 104 may, for example, manipulate the user interface 700 in some manner to indicate that a particular device is to be de-registered. For instance, the user may select the expansion icon 702 and select a "de-register device" option, e.g., from a dropdown menu or otherwise. The user may then be presented with a list of devices that user has previously registered with the device sharing system 102 and may select one of the listed devices for de-registration. Alternatively, the user may right click on, or otherwise select, an icon 706a, 706b, 706c corresponding to one of the registered devices listed on the bottom of the user interface 700 and then select a "de-register device" option, e.g., from a dropdown menu or otherwise. When a device to be de-registered has been determined (at the step 610), the routine 600 may proceed to a step 612, at which a request to de-register the selected device may be sent to the DMS 502 for processing.

At a step 614 of the routine 600, a determination may be made as to whether a request to view the peripherals devices that have been made available for sharing has been received. A user of the first device 104 may, for example, manipulate the user interface 700 in some manner to indicate a desire to view available peripheral devices. For instance, the user may click on, or otherwise select, the "device" icon 704 on the left-hand side of the user interface 700. Alternatively, the user may click on, or otherwise select, the expansion icon 702 and select a "view available devices" option, e.g., from a dropdown menu or otherwise. Upon detection of a request to view available peripheral devices, the routine 600 may proceed to a step 616, at which a process for retrieving pertinent device registration data from the DMS 502 may be performed. The retrieval process may, for example, involve retrieving from the DMS 502 information identifying any devices that have been registered for use by the client device from which the request originated and/or have been registered for use by the individual currently operating the client device from which the request originated. Alternatively, the retrieval process may simply involve retrieving device registration data for any peripheral devices that have been registered with the DMS 502. At a step 618, the list of available devices may be displayed, based on the retrieved device registration data. With reference to the user interface 700 shown in FIG. 7, for example, icons 706a, 706b, 706c and/or descriptions of the available peripheral devices may be displayed. In other embodiments, pertinent device registration data may additionally or alternatively be received from the DMS 502 in response to one or more peripheral devices being successfully registered with the DMS 502.

At a step 620 of the routine 600, a determination may be made as to whether a request to access one of the available peripheral devices has been received. For example, a user of the second device 108 may manipulate the user interface 700 in some manner to indicate a desire to access one of the peripheral devices identified by icons 706. For instance, the user may double click on one of the icons 706, or may select an "access device" option, e.g., from a dropdown menu or otherwise, after right clicking on or otherwise selecting one of the icons 706. Upon detection of a request to access one of the available peripheral devices, the routine 600 may proceed to a step 622, at which a request to access the selected peripheral device may be sent to the DMS 502.

At a step 624 of the routine 600, a determination may be made as to whether RTC instructions have been received from the DMS 502. Such RTC instructions may, for example, be received by the second device 108 after the device management module 506b of the second device 108 sends an access request to the DMS 502 (e.g., at the step 622). The manner in which the DMS 502 may send RTC instructions to a requesting client device (e.g., the second device 108) is described below in connection with steps 814 and 816 of FIG. 8. The RTC instructions received at the step 624 may, for example, include an identifier of the selected peripheral device (e.g., the peripheral device 106), pertinent operational parameters for the selected peripheral device and/or its device driver (e.g., the peripheral device 106 and/or the peripheral driver 510), a network address of the client device associated with the peripheral device (e.g., the first device 104), and a network address for the RTC service 504 to which an access request is to be sent by the requesting client device (e.g., the second device 108). As discussed below, the RTC service 504 may subsequently communicate with the client device associated with the specified peripheral device (e.g., the first device 104) using the indicated network address for that client device to coordinate signaling between that client device and the requesting client device (e.g., the second device 108) to establish a peer-to-peer connection (e.g., the peer-to-peer connection 118) between them.

At a step 626, an access request (including the pertinent operational parameters for the selected peripheral device and/or its device driver, and the network address of the client device associated with the peripheral device) may be sent to the RTC service 504 at the specified network address. In other embodiments, the access request sent to the RTC service 504 may simply include an identifier of the selected peripheral device, and the RTC service 504 may subsequently retrieve the other data, e.g., the pertinent operational parameters for the selected peripheral device and/or its device driver and the network address of the client device associated with the peripheral device, from the DMS 502. In still other embodiments, the DMS 502 may instead instruct each of the requesting client device (e.g., the second device 108) and the client device associated with the selected peripheral device (e.g., the first device 104) to send a message to the RTC service 504 (at a specified network address) indicating that access to the specified peripheral device has been requested. No matter how information is exchanged, the peripheral device sharing process described herein may continue so long as the RTC service 504 somehow ascertains the identity of the to-be-shared peripheral device (e.g., the peripheral device 106), pertinent operational parameters of that peripheral device and/or its device driver (e.g., the peripheral device 106 and/or the peripheral driver 510) and the network addresses of the two client devices participating in the device sharing process (e.g., the first device 104 and the second device 108).

Figure 8:
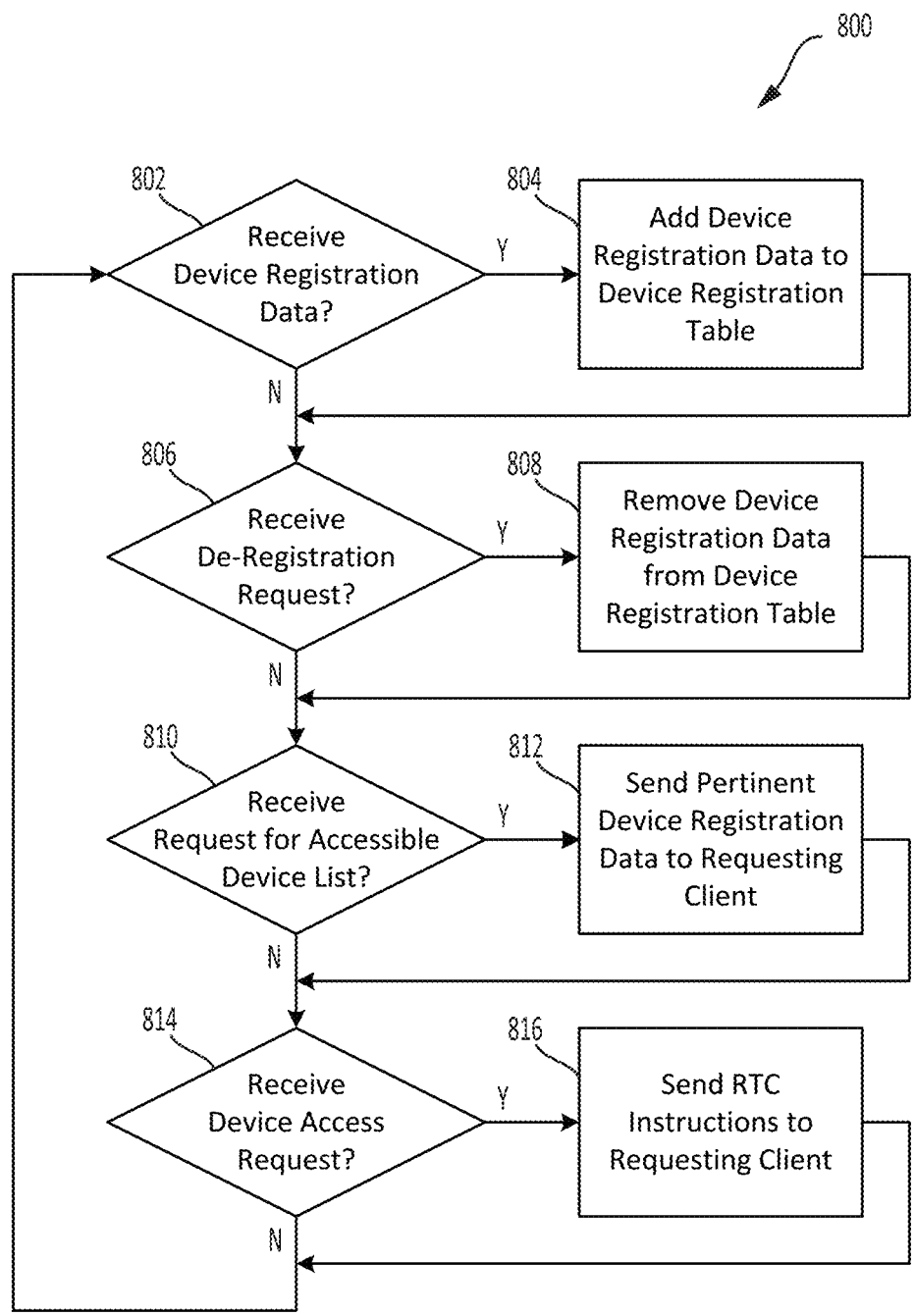
FIG. 8 shows an example routine that may be executed by the device management service (DMS) shown in FIG. 5 in accordance with some embodiments.

FIG. 8 shows an example routine 800 that may be executed by the DMS 502 in accordance with some embodiments. The DMS 502 may, for example, be embodied by a computing system including one or more processors and one or more computer-readable media encoded with instructions which, when executed by the one or more processors, cause the computing system to perform the routine 800. As shown, at a step 802, a determination may be made as to whether device registration data has been received from a client device (e.g., the first device 104). When device registration data is received (at the step 802), the received data may (at a step 804) be added to a device registration table (or other record) maintained by the DMS 502. The received and stored device registration data may, for example, correspond to device registration data that was sent to the DMS 502 from a device management engine 506 (e.g., the device management engine 506*a*) at the step 606 of the routine 600 shown in FIG. 6.

At a step 806 of the routine 800, a determination may be made as to whether a device de-registration request has been received from a client device (e.g., the first device 104). When a device de-registration request for a peripheral device is received (at the step 806), the device registration data previously stored in the device registration table for the specified peripheral device may (at a step 808) be removed from the table. Alternatively, a flag may be added to the table indicating that the specified device is currently "unavailable." The received de-registration request may, for example, correspond to device de-registration request that was sent to the DMS 502 from a device management engine 506 (e.g., the device management engine 506*a*) at the step 612 of the routine 600 shown in FIG. 6.

At a step 810 of the routine 800, a determination may be made as to whether a client device (e.g., the second device 108) has requested data concerning peripheral devices that are available for sharing. When such a request is received (at the step 810), pertinent data in the device registration table may (at a step 812) be retrieved and sent to the requesting client device. As noted above, in some embodiments, the identity of the requesting client device and/or the identity of the user authenticated to the requesting client device may be used in determining the registered devices that are currently available for sharing by the requesting client device. In other embodiments, data identifying any registered peripheral devices may be sent to the requesting client device without first determining whether the requesting client device is authorized to access such devices. The data sent to the requesting client device at the step 812 may, for example, correspond to pertinent device registration data that is retrieved by a device management engine 506 (e.g., the device management engine 506*b*) at the step 616 of the routine 600 shown in FIG. 6.

At a step 814 of the routine 800, a determination may be made as to whether a client device (e.g., the second device 108) has requested access to a particular peripheral device (e.g., peripheral device 106). After such a device access request is received (at the step 814), the routine 800 may proceed to a step 816, at which instructions for interacting with the RTC service 504 may be sent to the requesting client device (e.g., the second device 108). In some embodiments, the DMS 502 may also take one or more additional steps to determine whether to allow the second device 108 to access the particular peripheral device (e.g., the peripheral device 106) prior to sending the instructions for interacting with the RTC service 504 to the requesting client device. For example, in implementations in which the second device 108 and/or the user of the second device 108 has not already been granted access privileges for the peripheral device 106, the DMS 502 may seek authorization by the user of the first device 104 and/or a system administrator prior to sending the instructions for interacting with the RTC service 504 to the requesting client device. The RTC instructions the DMS 502 sends to the requesting client device at the step 816 may, for example, correspond to the RTC instructions received by a requesting client (e.g., the second device 108) at the step 624 of the routine 600 shown in FIG. 6.

Figure 9:
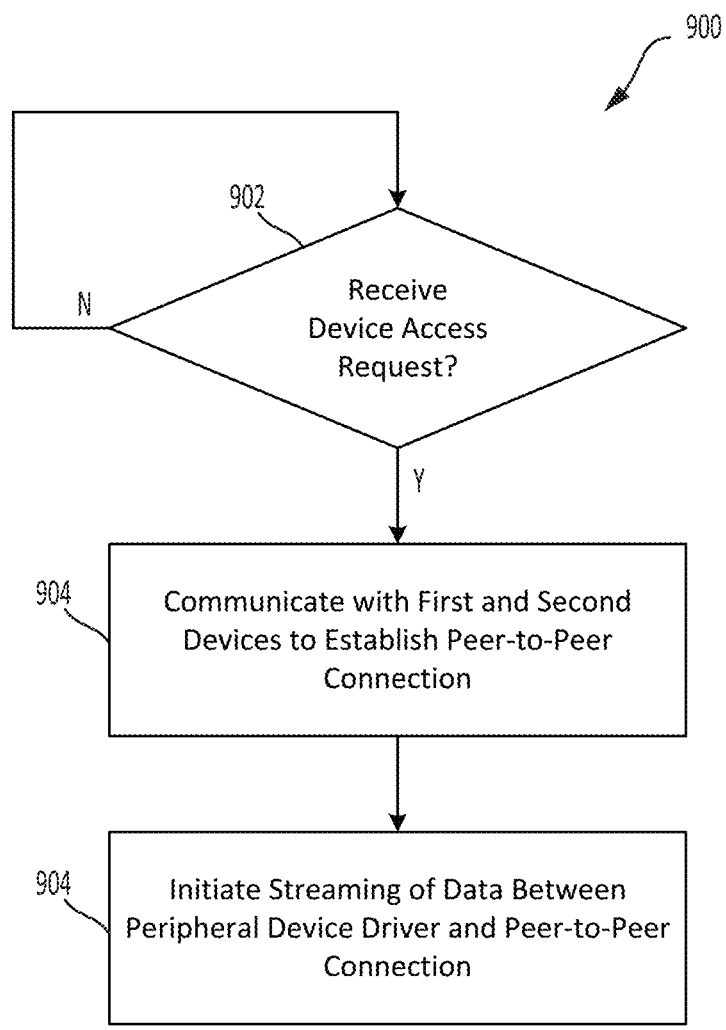
FIG. 9 shows an example routine that may be executed by the real-time communication (RTC) service shown in FIG. 5 in accordance with some embodiments.

FIG. 9 shows an example routine 900 that may be executed by the RTC service 504 (shown in FIG. 5) in accordance with some embodiments. The RTC service 504 may, for example, be embodied by a computing system including one or more processors and one or more computer-readable media encoded with instructions which, when executed by the one or more processors, cause the computing system to perform the routine 900. As shown, at a step 902, a determination made be made as to whether a device access request has been received from a client device (e.g., the second device 108). When such a device access request is received, the routine 900 may proceed to a step 904 (described below). The device access request received at the step 902 may, for example, correspond to the device access request sent from the device management engine 506 of the requesting device (e.g., the device management engine 506b of the second device 108) to the RTC service 504 at the step 626 of the routine 600 shown in FIG. 6.

At the step 904 of the routine 900, the RTC service 504 may communicate with the requesting client device (e.g., the second device 108) and the client device associated with the peripheral device desired to be shared (e.g., the first device 104) to cause a peer-to-peer connection to be established between those two devices. In some embodiments, for example, the RTC service 504 may invoke methods of the RTCPeerConnection API (included in the RTC modules 508 of those devices), and also coordinate the exchange of signaling information obtained using such methods, to establish a peer-to-peer connection (e.g., the peer-to-peer connection 118) between them. In some embodiments, the RTC service 504 may use the Interactive Connectivity Establishment (ICE) framework to cause an optimal peer-to-peer communication path to be determined.

WebRTC allows media to go from one computer to another, regardless of the network address translator (NAT) gateways that exist in between them. The ICE protocol, which uses two other protocols—Session Traversal Utilities for NAT (STUN) and Traversal Using Relays around NAT (TURN)—helps WebRTC dynamically generate and find the shortest path for data to travel between endpoints or peers. The ICE framework is described in Request for Comments (RFC) 8445, published by the Internet Engineering Task Force (IETF), and is accessible at www.tools.ietf.org at the path "html/rfc8445," the entire contents of which are incorporated herein by reference. The STUN protocol is described in RFC5389, published by the IETF, and is and is accessible at www.tools.ietf.org at the path "html/rfc5389," the entire contents of which are incorporated herein by reference. The TURN protocol is described in RFC5766, published by the IETF, and is and is accessible at www-.tools.ietf.org at the path "html/rfc5766," the entire contents of which are incorporated herein by reference. Using the ICE framework, the client devices may communicate directly using their public IP addresses if such addresses can be discovered using a STUN server. Such public IP addresses may be included in the signaling information that is exchange between the first device 104 and the second device 108 via the RTC service 504 (shown in FIG. 5). Otherwise, a TURN relay server may be used as an intermediary between the two clients to facilitate peer-to-peer communications between them.

In some embodiments, the RTC service 504 may also cause the client device associated with the to-be-shared peripheral (e.g., the first device 104) and the requesting client device (e.g., the second device 108) to determine and exchange session description information. The determination of session description information to be exchanged may be accomplished, for example, by causing the client device associated with the to-be-shared peripheral to run the createOffer( ) and setLocalDescription( ) methods of the RTCPeerConnection API, and causing the requesting client device to run the createAnswer( ) and setRemoteDescription methods of the RTCPeerConnection API.

After the peer-to-peer connection between client devices has been established, the routine 900 may proceed to a step 904, at which steps may be taken to enable streaming of data between the device driver for the to-be-shared peripheral device (e.g., the peripheral driver 510 shown in FIG. 5) and the established peer-to-peer connection (e.g., the peer-to-peer connection 118). In some embodiments, for example, such streaming may be initiated using one or more components of the WebRTC platform. When the to-be-shared peripheral device is of a type supported by the MediaStream API (also known as getUserMedia) of the WebRTC platform, e.g., certain cameras, microphones, display screen elements, etc., streaming between the peripheral device and to the peer-to-peer connection can be implemented using one or more methods of that API. For other to-be-shared peripheral devices, e.g., printers, Universal Serial Bus (USB) drives, etc., streaming between the driver of the peripheral device, e.g., the peripheral device driver 510, and the established peer-to-peer connection (e.g., the peer-to-peer connection 118) can be implemented using one or more methods of the RTCDataChannel API of the WebRTC platform.

The above described system thus enables one client device (e.g., the first device 104) to register a peripheral device (e.g., the peripheral device 106) with a central authority (e.g., the device sharing system 102), and enables another client device (e.g., the second device 108) to view and access the registered peripheral device as a virtual device.

F. Example Implementations of Methods, Systems, and Computer-Readable Media in Accordance with the Present Disclosure The following paragraphs (M1) through (M20) describe examples of methods that may be implemented in accordance with the present disclosure.

(M1) A computing system may perform a method that involves receiving, from a first device, a first indication that a peripheral device associated with the first device is available for sharing; sending, to a second device, a second indication that the peripheral device is available for sharing; receiving, from the second device, a request to access the peripheral device; and based at least in part on receipt of the request, causing a peer-to-peer connection to be established between the second device and the first device, the peer-to-peer connection enabling communication between the second device and the peripheral device.

(M2) A computing system may perform the method described in paragraph (M1), wherein the peer-to-peer connection further enables direction of the peripheral device to the second device so that the peripheral device is a virtual device of the second device.

(M3) A computing system may perform the method described in paragraph (M1) or paragraph (M2), wherein causing the peer-to-peer connection to be established may further involve receiving, from the first device, a first internet protocol (IP) address associated with the first device; sending the first IP address to the second device to enable the second device to direct first messages to the first device over the peer-to-peer connection; receiving, from the second device, a second IP address associated with the second device; and sending the second IP address to the first device to enable the first device to send second messages to the second device over the peer-to-peer connection.

(M4) A computing system may perform the method described in any of paragraphs (M1) through (M3), wherein causing the peer-to-peer connection to be established may further involve receiving, from the first device, first information identifying data handling capabilities of the first device; sending the first information to the second device to enable the second device to communicate with the peripheral device over the peer-to-peer connection; receiving, from the second device, second information identifying data handling capabilities of the second device; and sending the second information to the first device to enable the second device to communicate with the peripheral device over the peer-to-peer connection.

(M5) A computing system may perform the method described in any of paragraphs (M1) through (M4), and which may further involve updating a record to include first data indicating the peripheral device is available for sharing based at least in part on the first indication; and determining to send the second indication to the second device based at least in part on the first data.

(M6) A computing system may perform the method described in any of paragraphs (M1) through (M5), and which may further involve authenticating an identity of a user of the first device; and determining to update the record based at least in part on authenticating the identity of the user.

(M7) A computing system may perform the method described in any of paragraphs (M1) through (M6), and which may further involve authenticating an identity of a user of the second device; determining that the first data indicates the user is authorized to access the peripheral device; and sending the second indication to the second device based at least in part on the first data indicating the user is authorized to access the peripheral device.

(M8) A computing system may perform the method described in any of paragraphs (M1) through (M7), and wherein causing the peer-to-peer connection to be established may further involve causing the peer-to-peer connection to be established using an RTCPeer Connection application programming interface (API) of WebRTC.

(M9) A computing system may perform the method described in any of paragraphs (M1) through (M8), and which may further involve causing streaming of data between a driver of the peripheral device and the peer-to-peer connection using an RTCDataChannel application programming interface (API) of WebRTC.

(M10) A first device may perform a method that involves sending, to a computing system, a first indication that a peripheral device associated with the first device is available for sharing; receiving, from the computing system, a second indication that a second device has requested access to the peripheral device; based at least in part on receipt of the second indication, establishing a peer-to-peer connection between the first device and the second device; and communicating data between the peripheral device and the second device over the peer-to-peer connection.

(M11) A first device may perform the method described in paragraph (M10), and which may further involve directing the peripheral device to the second device so that the peripheral device is a virtual device of the second device.

(M12) A first device may perform the method described in paragraph (M10) or (M11), and which may further involve determining a first interne protocol (IP) address associated with the first device; sending the first IP address to the computing system; receiving, from the computing system, a second IP address associated with the second device; receiving, from the second device, first messages directed to the first IP address; and sending, to the second device, second messages directed to the second IP address.

(M13) A first device may perform the method described in any of paragraphs (M10) through (M12), and which may further involve determining first information identifying data handling capabilities of the first device; sending the first information to the computing system; and receiving, from the computing system, second information identifying data handling capabilities of the second device; wherein the first messages are formatted in accordance with the first information, and the second messages are formatted in accordance with the second information.

(M14) A first device may perform the method described in any of paragraphs (M10) through (M13), and which may further involve using an RTCPeer Connection application programming interface (API) of WebRTC to determine network configuration information for the peer-to-peer connection.

(M15) A first device may perform the method described in any of paragraphs (M10) through (M14), and which may further involve using an RTCDataChannel application programming interface (API) of WebRTC to stream data between a driver of the peripheral device and the peer-to-peer connection.

(M16) A second device may perform a method that involves receiving, from a computing system, an indication that a peripheral device associated with a first device is available for sharing; sending, to the computing system, a request to access to the peripheral device; establishing a peer-to-peer connection between the first device and the second device; and communicating with the peripheral device over the peer-to-peer connection.

(M17) A second device may perform the method described in paragraph (M16), wherein the peer-to-peer connection enables direction of the peripheral device to the second device so that the peripheral device is a virtual device of the second device.

(M18) A second device may perform the method described in paragraph (M16) or (M17), and which may further involve receiving, from the computing system, a first internet protocol (IP) address associated with the first device; determining a second IP address associated with the second device; sending the second IP address to the computing system; sending, to the first device, first messages directed to the first IP address; and receiving, from the first device, second messages directed to the second IP address.

(M19) A second device may perform the method described in any of paragraphs (M16) through (M18), and which may further involve receiving, from the computing system, first information identifying data handling capabilities of the first device; determining second information identifying data handling capabilities of the second device; and sending the second information to the computing system; wherein the first messages are formatted in accordance with the first information, and the second messages are formatted in accordance with the second information.

(M20) A second device may perform the method described in any of paragraphs (M16) through (M19), and which may further involve using an RTCPeer Connection application programming interface (API) of WebRTC to determine network configuration information for the peer-to-peer connection.

The following paragraphs (S1) through (S20) describe examples of systems and devices that may be implemented in accordance with the present disclosure.

(S1) A computing system may comprise at least one processor and at least one computer-readable medium. The at least one computer-readable medium may be encoded with instructions which, when executed by the at least one processor, cause the computing system to receive, from a first device, a first indication that a peripheral device associated with the first device is available for sharing; to send, to a second device, a second indication that the peripheral device is available for sharing; to receive, from the second device, a request to access the peripheral device; and based at least in part on receipt of the request, to cause a peer-to-peer connection to be established between the second device and the first device, the peer-to-peer connection enabling communication between the second device and the peripheral device.

(S2) A computing system may be configured as described in paragraph (S1), and the at least one computer-readable medium may further be encoded with additional instructions which, when executed by the at least one processor, further cause the computing system to establish the peer-to-peer connection so as to enable direction of the peripheral device to the second device so that the peripheral device is a virtual device of the second device.

(S3) A computing system may be configured as described in paragraph (S1) or paragraph (S2), and the at least one computer-readable medium may further be encoded with additional instructions which, when executed by the at least one processor, further cause the computing system to cause the peer-to-peer connection to be established at least by receiving, from the first device, a first internet protocol (IP) address associated with the first device; sending the first IP address to the second device to enable the second device to direct first messages to the first device over the peer-to-peer connection; receiving, from the second device, a second IP address associated with the second device; and sending the second IP address to the first device to enable the first device to send second messages to the second device over the peer-to-peer connection.

(S4) A computing system may be configured as described in any of paragraphs (S1) through (S3), and the at least one computer-readable medium may further be encoded with additional instructions which, when executed by the at least one processor, further cause the computing system to cause the peer-to-peer connection to be established at least by receiving, from the first device, first information identifying data handling capabilities of the first device; sending the first information to the second device to enable the second device to communicate with the peripheral device over the peer-to-peer connection; receiving, from the second device, second information identifying data handling capabilities of the second device; and sending the second information to the first device to enable the second device to communicate with the peripheral device over the peer-to-peer connection.

(S5) A computing system may be configured as described in any of paragraphs (S1) through (S4), and the at least one computer-readable medium may further be encoded with additional instructions which, when executed by the at least one processor, further cause the computing system to update a record to include first data indicating the peripheral device is available for sharing based at least in part on the first indication; and determine to send the second indication to the second device based at least in part on the first data.

(S6) A computing system may be configured as described in any of paragraphs (S1) through (S5), and the at least one computer-readable medium may further be encoded with additional instructions which, when executed by the at least one processor, further cause the computing system to authenticate an identity of a user of the first device; and to determine to update the record based at least in part on authenticating the identity of the user.

(S7) A computing system may be configured as described in any of paragraphs (S1) through (S6), and the at least one computer-readable medium may further be encoded with additional instructions which, when executed by the at least one processor, further cause the computing system to authenticate an identity of a user of the second device; to determine that the first data indicates the user is authorized to access the peripheral device; and to send the second indication to the second device based at least in part on the first data indicating the user is authorized to access the peripheral device.

(S8) A computing system may be configured as described in any of paragraphs (S1) through (S7), and the at least one computer-readable medium may further be encoded with additional instructions which, when executed by the at least one processor, further cause the computing system to cause the peer-to-peer connection to be established using an RTCPeer Connection application programming interface (API) of WebRTC.

(S9) A computing system may be configured as described in any of paragraphs (S1) through (S8), and the at least one computer-readable medium may further be encoded with additional instructions which, when executed by the at least one processor, further cause the computing system to cause streaming of data between a driver of the peripheral device and the peer-to-peer connection using an RTCDataChannel application programming interface (API) of WebRTC.

(S10) A first device may include at least one processor and at least one computer-readable medium. The at least one computer-readable medium may be encoded with instructions which, when executed by the at least one processor, cause the first device to send, to a computing system, a first indication that a peripheral device associated with the first device is available for sharing; to receive, from the computing system, a second indication that a second device has requested access to the peripheral device; to establish a peer-to-peer connection between the first device and the second device based at least in part on receipt of the second indication; and to communicate data between the peripheral device and the second device over the peer-to-peer connection.

(S11) A first device may be configured as described in paragraph (S10), and the at least one computer-readable medium may further be encoded with additional instructions which, when executed by the at least one processor, further cause the first device to direct the peripheral device to the second device so that the peripheral device is a virtual device of the second device.

(S12) A first device may be configured as described in paragraph (S10) or paragraph (S11), and the at least one computer-readable medium may further be encoded with additional instructions which, when executed by the at least one processor, further cause the first device to determine a first internet protocol (IP) address associated with the first device; to send the first IP address to the computing system; to receive, from the computing system, a second IP address associated with the second device; to receive, from the second device, first messages directed to the first IP address; and to send, to the second device, second messages directed to the second IP address.

(S13) A first device may be configured as described in any of paragraphs (S10) through (S12), and the at least one computer-readable medium may further be encoded with additional instructions which, when executed by the at least one processor, further cause the first device to determine first information identifying data handling capabilities of the first device; to send the first information to the computing system; and to receive, from the computing system, second information identifying data handling capabilities of the second device; wherein the first messages are formatted in accordance with the first information, and the second messages are formatted in accordance with the second information.

(S14) A first device may be configured as described in any of paragraphs (S10) through (S13), and the at least one computer-readable medium may further be encoded with additional instructions which, when executed by the at least one processor, further cause the first device to use an RTCPeer Connection application programming interface (API) of WebRTC to determine network configuration information for the peer-to-peer connection.

(S15) A first device may be configured as described in any of paragraphs (S10) through (S14), and the at least one computer-readable medium may further be encoded with additional instructions which, when executed by the at least one processor, further cause the first device to use an RTCDataChannel application programming interface (API) of WebRTC to stream data between a driver of the peripheral device and the peer-to-peer connection.

(S16) A second device may include at least one processor and at least one computer-readable medium. The at least one computer-readable medium may be encoded with instructions which, when executed by the at least one processor, cause the second device to receive, from a computing system, an indication that a peripheral device associated with a first device is available for sharing; to send, to the computing system, a request to access to the peripheral device; to establish a peer-to-peer connection between the first device and the second device; and to communicate with the peripheral device over the peer-to-peer connection.

(S17) A second device may be configured as described in paragraph (S16), and may be further configured such that the peer-to-peer connection enables direction of the peripheral device to the second device so that the peripheral device is a virtual device of the second device.

(S18) A second device may be configured as described in paragraph (S16) or paragraph (S17), and the at least one computer-readable medium may further be encoded with additional instructions which, when executed by the at least one processor, further cause the second device to receive, from the computing system, a first interne protocol (IP) address associated with the first device; to determine a second IP address associated with the second device; to send the second IP address to the computing system; send, to the first device, first messages directed to the first IP address; and to receive, from the first device, second messages directed to the second IP address.

(S19) A second device may be configured as described in any of paragraphs (S16) through (S17), and the at least one computer-readable medium may further be encoded with additional instructions which, when executed by the at least one processor, further cause the second device to receive, from the computing system, first information identifying data handling capabilities of the first device; to determine second information identifying data handling capabilities of the second device; and to send the second information to the computing system; wherein the first messages are formatted in accordance with the first information, and the second messages are formatted in accordance with the second information.

(S20) A second device may be configured as described in any of paragraphs (S16) through (S19), and the at least one computer-readable medium may further be encoded with additional instructions which, when executed by the at least one processor, further cause the second device to use an RTCPeer Connection application programming interface (API) of WebRTC to determine network configuration information for the peer-to-peer connection.

The following paragraphs (CRM1) through (CRM20) describe examples of computer-readable media that may be implemented in accordance with the present disclosure.

(CRM1) At least one non-transitory, computer-readable medium may be encoded with instructions which, when executed by at least one processor included in a computing system, cause the computing system to receive, from a first device, a first indication that a peripheral device associated with the first device is available for sharing; to send, to a second device, a second indication that the peripheral device is available for sharing; to receive, from the second device, a request to access the peripheral device; and based at least in part on receipt of the request, to cause a peer-to-peer connection to be established between the second device and the first device, the peer-to-peer connection enabling communication between the second device and the peripheral device.

(CRM2) At least one computer-readable medium may be configured as described in (CRM1), and may be further encoded with additional instructions which, when executed by the at least one processor, further cause the computing system to establish the peer-to-peer connection so as to enable direction of the peripheral device to the second device so that the peripheral device is a virtual device of the second device.

(CRM3) At least one computer-readable medium may be configured as described in paragraph (CRM1) or paragraph (CRM2), and may further be encoded with additional instructions which, when executed by the at least one processor, further cause the computing system to cause the peer-to-peer connection to be established at least by receiving, from the first device, a first internet protocol (IP) address associated with the first device; sending the first IP address to the second device to enable the second device to direct first messages to the first device over the peer-to-peer connection; receiving, from the second device, a second IP address associated with the second device; and sending the second IP address to the first device to enable the first device to send second messages to the second device over the peer-to-peer connection.

(CRM4) At least one computer-readable medium may be configured as described in any of paragraphs (CRM1) through (CRM3), and may further be encoded with additional instructions which, when executed by the at least one processor, further cause the computing system to cause the peer-to-peer connection to be established at least by receiving, from the first device, first information identifying data handling capabilities of the first device; sending the first information to the second device to enable the second device to communicate with the peripheral device over the peer-to-peer connection; receiving, from the second device, second information identifying data handling capabilities of the second device; and sending the second information to the first device to enable the second device to communicate with the peripheral device over the peer-to-peer connection.

(CRM5) At least one computer-readable medium may be configured as described in any of paragraphs (CRM1) through (CRM4), and may further be encoded with additional instructions which, when executed by the at least one processor, further cause the computing system to update a record to include first data indicating the peripheral device is available for sharing based at least in part on the first indication; and determine to send the second indication to the second device based at least in part on the first data.

(CRM6) At least one computer-readable medium may be configured as described in any of paragraphs (CRM1) through (CRM5), and may further be encoded with additional instructions which, when executed by the at least one processor, further cause the computing system to authenticate an identity of a user of the first device; and to determine to update the record based at least in part on authenticating the identity of the user.

(CRM7) At least one computer-readable medium may be configured as described in any of paragraphs (CRM1) through (CRM6), and may further be encoded with additional instructions which, when executed by the at least one processor, further cause the computing system to authenticate an identity of a user of the second device; to determine that the first data indicates the user is authorized to access the peripheral device; and to send the second indication to the second device based at least in part on the first data indicating the user is authorized to access the peripheral device.

(CRM8) At least one computer-readable medium may be configured as described in any of paragraphs (CRM1) through (CRM7), and may further be encoded with additional instructions which, when executed by the at least one processor, further cause the computing system to cause the peer-to-peer connection to be established using an RTCPeer Connection application programming interface (API) of WebRTC.

(CRM9) At least one computer-readable medium may be configured as described in any of paragraphs (CRM1) through (CRM8), and may further be encoded with additional instructions which, when executed by the at least one processor, further cause the computing system to cause streaming of data between a driver of the peripheral device and the peer-to-peer connection using an RTCDataChannel application programming interface (API) of WebRTC.

(CRM10) At least one non-transitory, computer-readable medium may be encoded with instructions which, when executed by at least one processor included in a first device, cause the first device to send, to a computing system, a first indication that a peripheral device associated with the first device is available for sharing; to receive, from the computing system, a second indication that a second device has requested access to the peripheral device; to establish a peer-to-peer connection between the first device and the second device based at least in part on receipt of the second indication; and to communicate data between the peripheral device and the second device over the peer-to-peer connection.

(CRM11) At least one computer-readable medium may be configured as described in paragraph (CRM10), and may further be encoded with additional instructions which, when executed by the at least one processor, further cause the first device to direct the peripheral device to the second device so that the peripheral device is a virtual device of the second device.

(CRM12) At least one computer-readable medium may be configured as described in paragraph (CRM10) or paragraph (CRM11), and may further be encoded with additional instructions which, when executed by the at least one processor, further cause the first device to determine a first internet protocol (IP) address associated with the first device; to send the first IP address to the computing system; to receive, from the computing system, a second IP address associated with the second device; to receive, from the second device, first messages directed to the first IP address; and to send, to the second device, second messages directed to the second IP address.

(CRM13) At least one computer-readable medium may be configured as described in any of paragraphs (CRM10) through (CRM12), and may further be encoded with additional instructions which, when executed by the at least one processor, further cause the first device to determine first information identifying data handling capabilities of the first device; to send the first information to the computing system; and to receive, from the computing system, second information identifying data handling capabilities of the second device; wherein the first messages are formatted in accordance with the first information, and the second messages are formatted in accordance with the second information.

(CRM14) At least one computer-readable medium may be configured as described in any of paragraphs (CRM10) through (CRM13), and may further be encoded with additional instructions which, when executed by the at least one processor, further cause the first device to use an RTCPeer Connection application programming interface (API) of WebRTC to determine network configuration information for the peer-to-peer connection.

(CRM15) At least one computer-readable medium may be configured as described in any of paragraphs (CRM10) through (CRM14), and may further be encoded with additional instructions which, when executed by the at least one processor, further cause the first device to use an RTCDataChannel application programming interface (API) of WebRTC to stream data between a driver of the peripheral device and the peer-to-peer connection.

(CRM16) At least one non-transitory, computer-readable medium may be encoded with instructions which, when executed by at least one processor included in a second device, cause the second device to receive, from a computing system, an indication that a peripheral device associated with a first device is available for sharing; to send, to the computing system, a request to access to the peripheral device; to establish a peer-to-peer connection between the first device and the second device; and to communicate with the peripheral device over the peer-to-peer connection.

(CRM17) At least one computer-readable medium may be configured as described in paragraph (CRM16), and may further be encoded with additional instructions which, when executed by the at least one processor, further cause the peer-to-peer connection to be established so as to enable direction of the peripheral device to the second device so that the peripheral device is a virtual device of the second device.

(CRM18) At least one computer-readable medium may be configured as described in paragraph (CRM16) or paragraph (CRM17), and may further be encoded with additional instructions which, when executed by the at least one processor, further cause the second device to receive, from the computing system, a first internet protocol (IP) address associated with the first device; to determine a second IP address associated with the second device; to send the second IP address to the computing system; send, to the first device, first messages directed to the first IP address; and to receive, from the first device, second messages directed to the second IP address.

(CRM19) At least one computer-readable medium may be configured as described in any of paragraphs (CRM16) through (CRM17), and may further be encoded with additional instructions which, when executed by the at least one processor, further cause the second device to receive, from the computing system, first information identifying data handling capabilities of the first device; to determine second information identifying data handling capabilities of the second device; and to send the second information to the computing system; wherein the first messages are formatted in accordance with the first information, and the second messages are formatted in accordance with the second information.

(CRM20) At least one computer-readable medium may be configured as described in any of paragraphs (CRM16) through (CRM19), and may further be encoded with additional instructions which, when executed by the at least one processor, further cause the second device to use an RTCPeer Connection application programming interface (API) of WebRTC to determine network configuration information for the peer-to-peer connection.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method performed by a computing system, comprising:
   receiving, by a computing system and from a first device, a request to access a peripheral device associated with a second device; and
   based at least in part on receipt of the request, causing a peer-to-peer connection to be established between the first device and the second device by sending instructions to the first device, the instructions including an identifier of the peripheral device, a network address of the second device, and a network address for a service to which the first device is to send a request to coordinate signaling between the first device and the second device to establish the peer-to-peer connection, the peer-to-peer connection enabling communication between the first device and the peripheral device.

2. The method of claim 1, wherein the network address of the second device comprises a first internet protocol (IP) address to which the first device can direct first messages over the peer-to-peer connection, and causing the peer-to-peer connection to be established further comprises:
   receiving, from the first device, a second IP address associated with the first device; and
   sending the second IP address to the second device to enable the second device to send second messages to the first device over the peer-to-peer connection.

3. The method of claim 1, wherein causing the peer-to-peer connection to be established further comprises:
   receiving, from the second device, first information identifying data handling capabilities of the second device;
   sending the first information to the first device to enable the first device to communicate with the second device over the peer-to-peer connection;
   receiving, from the first device, second information identifying data handling capabilities of the first device; and
   sending the second information to the second device to enable the second device to communicate with the first device over the peer-to-peer connection.

4. The method of claim 1, wherein causing the peer-to-peer connection to be established further comprises:
   causing the peer-to-peer connection to be established using an RTCPeer Connection application programming interface (API) of WebRTC.

5. The method of claim 1, further comprising:
   authenticating, by the computing system, an identity of a first user of the first device; and
   determining, by the computing system, to cause the peer-to-peer connection to be established between the first device and the second device based at least in part on authenticating the identity of the first user.

6. The method of claim 5, further comprising:
   authenticating, by the computing system, an identity of a second user of the second device;
   wherein determining to cause the peer-to-peer connection to be established between the first device and the second device is further based at least in part on authenticating the identity of the second user.

7. The method of claim 1, further comprising:
   based at least in part on receipt of the request, enabling streaming of data between a driver for the peripheral device and the peer-to-peer connection to direct the peripheral device to the first device so that the peripheral device operates as a virtual device of the first device, wherein the second device includes the driver.

8. The method of claim 7, further comprising:
   enabling streaming of data between the driver and the peer-to-peer connection comprises using an RTC-DataChannel application programming interface (API) of WebRTC to stream data between the driver and the peer-to-peer connection.

9. A computing system, comprising:
   at least one processor; and
   at least one computer-readable medium encoded with instructions which, when executed by the at least one processor, cause the computing system to:
      receive, from a first device, a request to access a peripheral device associated with a second device, and
      based at least in part on receipt of the request, cause a peer-to-peer connection to be established between the first device and the second device by sending instructions to the first device, the instructions including an identifier of the peripheral device, a network address of the second device, and a network address for a service to which the first device is to send a request to coordinate signaling between the first device and the second device to establish the peer-to-peer connection, the peer-to-peer connection enabling communication between the first device and the peripheral device.

10. The computing system of claim 9, wherein the network address of the second device comprises a first internet protocol (IP) address to which the first device can direct first messages over the peer-to-peer connection, and the at least one computer-readable medium is further encoded with additional instructions which, when executed by the at least one processor, cause the computing system to cause the peer-to-peer connection to be established at least in part by:
receiving, from the first device, a second IP address associated with the first device; and
sending the second IP address to the second device to enable the second device to send second messages to the first device over the peer-to-peer connection.

11. The computing system of claim 9, wherein the at least one computer-readable medium is further encoded with additional instructions which, when executed by the at least one processor, further the computing system to cause the peer-to-peer connection to be established at least in part by:
receiving, from the second device, first information identifying data handling capabilities of the second device;
sending the first information to the first device to enable the first device to communicate with the second device over the peer-to-peer connection;
receiving, from the first device, second information identifying data handling capabilities of the first device; and
sending the second information to the second device to enable the second device to communicate with the first device over the peer-to-peer connection.

12. The computing system of claim 9, wherein the at least one computer-readable medium is further encoded with additional instructions which, when executed by the at least one processor, cause the computing system to cause the peer-to-peer connection to be established at least in part by:
causing the peer-to-peer connection to be established using an RTCPeer Connection application programming interface (API) of WebRTC.

13. The computing system of claim 9, wherein the at least one computer-readable medium is further encoded with additional instructions which, when executed by the at least one processor, cause the computing system to:
authenticate an identity of a first user of the first device; and
determine to cause the peer-to-peer connection to be established between the first device and the second device based at least in part on authenticating the identity of the first user.

14. The computing system of claim 13, wherein the at least one computer-readable medium is further encoded with additional instructions which, when executed by the at least one processor, cause the computing system to:
authenticate an identity of a second user of the second device; and
determine to cause the peer-to-peer connection to be established between the first device and the second device further based at least in part on authenticating the identity of the second user.

15. The computing system of claim 9, wherein the at least one computer-readable medium is further encoded with additional instructions which, when executed by the at least one processor, cause the computing system to:

based at least in part on receipt of the request, enable streaming of data between a driver for the peripheral device and the peer-to-peer connection to direct the peripheral device to the first device so that the peripheral device operates as a virtual device of the first device, wherein the second device includes the driver.

16. The computing system of claim 15, wherein the at least one computer-readable medium is further encoded with additional instructions which, when executed by the at least one processor, cause the computing system to:
enable streaming of data between the driver and the peer-to-peer connection comprises using an RTC-DataChannel application programming interface (API) of WebRTC to stream data between the driver and the peer-to-peer connection.

17. At least one non-transitory computer-readable medium encoded with instructions which, when executed by at least one processor of a computing system, cause the computing system to:
receive, from a first device, a request to access a peripheral device associated with a second device, and
based at least in part on receipt of the request, cause a peer-to-peer connection to be established between the first device and the second device by sending instructions to the first device, the instructions including an identifier of the peripheral device, a network address of the second device, and a network address for a service to which the first device is to send a request to coordinate signaling between the first device and the second device to establish the peer-to-peer connection, the peer-to-peer connection enabling communication between the first device and the peripheral device.

18. The at least one non-transitory computer-readable medium of claim 17, wherein the network address of the second device comprises a first interne protocol (IP) address to which the first device can direct first messages over the peer-to-peer connection, and the at least one non-transitory computer-readable medium is further encoded with additional instructions which, when executed by the at least one processor, cause the computing system to cause the peer-to-peer connection to be established at least in part by:
receiving, from the first device, a second IP address associated with the first device; and
sending the second IP address to the second device to enable the second device to send second messages to the first device over the peer-to-peer connection.

19. The at least one non-transitory computer-readable medium of claim 17, further encoded with additional instructions which, when executed by the at least one processor, cause the computing system to:
based at least in part on receipt of the request, enable streaming of data between a driver for the peripheral device and the peer-to-peer connection to direct the peripheral device to the first device so that the peripheral device operates as a virtual device of the first device, wherein the second device includes the driver.

20. The at least one non-transitory computer-readable medium of claim 19, further encoded with additional instructions which, when executed by the at least one processor, cause the computing system to:
enable streaming of data between the driver and the peer-to-peer connection comprises using an RTC-DataChannel application programming interface (API) of WebRTC to stream data between the driver and the peer-to-peer connection.

* * * * *